US012792655B2

(12) United States Patent
Dunn et al.

(10) Patent No.: US 12,792,655 B2
(45) Date of Patent: Nov. 10, 2026

(54) SYSTEMS, METHODS, AND COMPUTER-READABLE MEDIA FOR APPLICATION AWARE SEQUENCE GENERATION AND EXECUTION

(71) Applicant: Cephable Inc., Wilmington, MA (US)

(72) Inventors: Alexander Dunn, Wilmington, MA (US); Cordellia Yokum, Baltimore, MD (US); Shristi Chitlangia, Cambridge, MA (US)

(73) Assignee: Cephable Inc., Wilmington, MA (US)

( * ) Notice: Subject to any disclaimer, the term of this patent is extended or adjusted under 35 U.S.C. 154(b) by 0 days.

(21) Appl. No.: 19/548,439

(22) Filed: Feb. 24, 2026

(65) Prior Publication Data

US 2026/0252610 A1 Aug. 27, 2026

Related U.S. Application Data

(60) Provisional application No. 63/763,025, filed on Feb. 25, 2025.

(51) Int. Cl.

| | |
|---|---|
| ***G06F 16/335*** | (2019.01) |
| ***G06F 16/2452*** | (2019.01) |
| ***G06F 40/40*** | (2020.01) |

(52) U.S. Cl.
CPC ...... *G06F 16/337* (2019.01); *G06F 16/24522* (2019.01); *G06F 40/40* (2020.01)

(58) Field of Classification Search
CPC .. G06F 16/24; G06F 16/243; G06F 16/24522; G06F 16/337; G06F 40/40
See application file for complete search history.

(56) References Cited

U.S. PATENT DOCUMENTS 5,748,974 A * 5/1998 Johnson .............. G06F 9/45512 704/9
11,908,475 B1 * 2/2024 Dunn ........................ G06T 7/20
(Continued)

FOREIGN PATENT DOCUMENTS

WO 2024182818 A1 9/2024
WO 2025024326 A2 1/2025

OTHER PUBLICATIONS

International Search Report and Written Opinion for PCT/US2026/016411 dated Apr. 30, 2026.

*Primary Examiner* — James E Richardson
(74) *Attorney, Agent, or Firm* — Reed Smith LLP; Gerard M. Donovan; Paul J. McDonnell

(57) ABSTRACT

Methods for application aware sequence generation and execution that include receiving a first user input, analyzing, the first user input to detect a command to be performed on a user device, determining an application environment of the user device based at least in part on traversing one or more accessibility trees corresponding to an operating system of the user device and one or more applications of the user device, analyzing the command using a natural language understanding (NLU) model to identify one or more parameters of the command, retrieving an application profile based at least in part on the application environment of the user device and the one or more parameters of the command, generating a first sequence corresponding to the command, the sequence comprising one or more steps to be executed in one or more applications corresponding to the application profile, and executing a first step of the one or more steps of the sequence in an application of the one or more applications corresponding to the application profile; including systems and non-transitory media for performing said methods.

20 Claims, 10 Drawing Sheets

(56) References Cited

U.S. PATENT DOCUMENTS

| | | | |
|---|---|---|---|
| 2017/0206064 | A1 | 7/2017 | Breazeal et al. |
| 2018/0004397 | A1* | 1/2018 | Mazzocchi ........... G06F 18/214 |
| 2019/0102482 | A1* | 4/2019 | Ni ....................... G06F 16/3334 |
| 2021/0200763 | A1* | 7/2021 | Wang .................. G06F 18/2148 |
| 2023/0342188 | A1* | 10/2023 | Dunn .................... G06F 9/4831 |
| 2023/0350550 | A1 | 11/2023 | Yim et al. |
| 2024/0274129 | A1 | 8/2024 | Dunn |
| 2025/0016128 | A1 | 1/2025 | Wheeler et al. |

* cited by examiner

SYSTEMS, METHODS, AND COMPUTER-READABLE MEDIA FOR APPLICATION AWARE SEQUENCE GENERATION AND EXECUTION

CROSS-REFERENCE TO RELATED APPLICATIONS

This application is related to and claims priority to U.S. Provisional Application No. 63/763,025 filed on Feb. 25, 2025, the disclosure of which is hereby incorporated by reference in its entirety.

BACKGROUND

In the current state of the technology for task automation in computing environments, task automation relies primarily on two approaches: static automation (e.g., macros, scripts, rules), and LLM-driven agentic automation.

Static automation approaches such as recorded macros, hard-coded scripts, or rule-based assistants operate with limited awareness of application structure or runtime context. These systems typically bind automation logic directly to UI recordings, fixed command mappings, or preconfigured rules, which creates technological challenges. It makes them fragile and error prone when applications update, UI layouts change, or execution spans more than a single device. Readiness and success are often assumed rather than verified, with little ability to reason about application state, execution outcomes, or partial failure at a per-step level. As a result, existing solutions struggle to reliably coordinate actions across applications, adapt to changing runtime conditions, or provide consistent behavior across different environments or operating systems.

More recent approaches attempt to automate tasks using large language models (LLMs) to dynamically generate action sequences at execution time. While these systems can interpret natural language requests, they often rely on unconstrained text generation to determine execution steps, which can lead to different technological challenges, including inconsistent behavior, hallucinated actions, or variability across executions of the same request. Such approaches may produce different results depending on model state, prompt phrasing, or runtime conditions, and typically lack deterministic validation of application state, step-level success criteria, or guarantees of repeatable behavior across environments or operating systems. As a result, LLM-driven automation systems can be difficult to reuse, validate, or trust for repeated execution, particularly in scenarios requiring consistency, reliability, or coordination across multiple applications or devices.

In addition, most current approaches for LLM-driven automation systems require network access. This creates problems where network access is unreliable or non-existent, causing increases in latency and quality that delay user outcomes. Similarly, approaches that require a network connection increase the risk of exposing sensitive user data that traverses the network or is housed in an off-device database.

There is therefore a need for improved techniques that support application-aware automation, reusable sequences, and runtime validation of execution behavior. In particular, existing approaches lack mechanisms for leveraging application context and structured action definitions to generate sequences that can be reused after initial user interaction, execute reliably across different environments or operating systems, and adapt to changing application state or device availability during execution. There is further a need for a local, on-device solution that does not require network access to improve latency and data privacy.

SUMMARY

In some aspects, the present disclosure relates to a method executed by one or more computing devices comprising the steps of: receiving a first user input; analyzing, based at least in part on a user profile, the first user input to detect a command to be performed on a user device; determining, an application environment of the user device based at least in part on traversing one or more accessibility trees corresponding to an operating system of the user device and one or more applications of the user device; analyzing, based at least in part on the application environment of the user device, the command using a natural language understanding (NLU) model to identify one or more parameters of the command; retrieving an application profile based at least in part on the application environment of the user device and the one or more parameters of the command; generating, based at least in part on the application profile and one or more of the one or more parameters of the command, a first sequence corresponding to the command, the sequence comprising one or more steps to be executed in one or more applications corresponding to the application profile; executing a first step of the one or more steps of the sequence in an application of the one or more applications corresponding to the application profile; and determining, based at least in part on the application environment, whether a post-execution condition is satisfied.

The step of determining an application context of the application environment of the user device can include the steps of analyzing a user interface of the user device with one or more screen analysis techniques; identifying a foreground application on the user device; storing one or more identified application elements and one or more operating system elements in a local cache and applying a multi-stage filtering process to each of the one or more identified application elements and one or more operating system elements; and ranking one or more filtered application elements and one or more operating system elements by relevance based at least in part on one or more of the one or more parameters of the command.

The step of generating an application profile based at least in part on the application context of the application environment of the user device and the one or more parameters of the command can include the steps of identifying one or more data sources that include data corresponding to one or more actions that can be performed in an application; analyzing the one or more data sources to extract data corresponding to one or more actions that can be performed in the application; parsing the extracted data corresponding to one or more actions that can be performed in the application to identify one or more structured pairs of labels and actions that can be performed in the application; converting one or more of the one or more structured pairs of labels and actions that can be performed in the application to a text-to-text transformer model; processing one or more of the one or more text-to-text transformer model-formatted structured pairings of labels and actions to generate one or more processed text-to-text transformer model-formatted structured pairings of labels and actions; generating a validation report corresponding to one or more of the one or more processed text-to-text transformer model-formatted structured pairings of labels and actions; and storing an application profile comprising one or more of the one or more processed text-to-text transformer model-formatted structured pairings of labels and actions.

The step of executing the first step of the one or more steps of the sequence in an application of the one or more applications corresponding to the application profile can include the steps of retrieving the sequence; fetching a step definition corresponding to the first step of the sequence; and determining whether a pre-condition to execute the first step of the sequence is satisfied. If the pre-condition to execute the first step of the sequence is determined satisfied, executing a first step of the one or more steps of the sequence in an application of the one or more applications corresponding to the application profile can include the step of executing the first step of the sequence in an application of the one or more applications corresponding to the application profile. If the pre-condition to execute the first step of the sequence is determined not satisfied, then executing a first step of the one or more steps of the sequence in an application of the one or more applications corresponding to the application profile can include the steps of generating, based at least in part on determining the pre-condition to execute the first step of the sequence is not satisfied, a prompt requesting user intervention; receiving a response to the prompt requesting user intervention, the response comprising a second user input; executing, based at least in part on the response to the prompt requesting user intervention, the first step of the sequence in an application of the one or more applications corresponding to the application profile; and updating, based at least in part on the response to the prompt requesting user intervention, the sequence.

In some aspects, the sequence can include a plurality of steps. If the post-execution condition of the first step is determined satisfied, the method further includes the steps of executing a next step of the plurality of steps of the sequence in an application of the one or more applications corresponding to the application profile. If the post-execution condition of the first step is determined not satisfied, the method can further include the steps of generating, based at least in part on determining the post-execution condition of the first step of the sequence is not satisfied, a prompt requesting user intervention; receiving, a response to the prompt requesting user intervention, the response comprising a second user input; executing, based at least in part on the response to the prompt requesting user intervention, the next step of the plurality of steps of the sequence in an application of the one or more applications corresponding to the application profile; and updating, based at least in part on the response to the prompt requesting user intervention, the sequence.

In some aspects, parameters of the command can include one or more of an explicit intent, a goal-oriented intent, and a constraint.

In some aspects, the method can further include generating a report comprising one or more indicators corresponding to whether one or more steps of the sequence were executed successfully; classifying the one or more indicators corresponding to whether one or more steps of the sequence were executed successfully; training one or more models based at least in part on the one or more indicators corresponding to whether one or more steps of the sequence were executed successfully; and performing a validation assessment of the training using regression testing.

In some aspects, the present disclosure relates to a system that includes one or more processors and one or more memories operatively coupled to at least one of the one or more processors and having instructions stored thereon that, when executed by at least one of the one or more processors, cause at least one of the one or more processors to perform any of the methods described above.

In some aspects, the present disclosure relates to at least one non-transitory computer-readable medium storing computer-readable instructions that, when executed by at least one of one or more computing devices, cause at least one of the one or more computing devices to perform any of the methods described above.

DETAILED DESCRIPTION

While methods, systems, and computer-readable media are described herein by way of examples and embodiments, those skilled in the art recognize that methods, systems, and computer-readable media for converting user input into output are not limited to the embodiments or drawings described. It will be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the words “may” and “can” are used in a permissive sense (i.e., meaning having the potential to) rather than the mandatory sense (i.e., meaning must). Similarly, the words “include,” “including,” and “includes” mean including, but not limited to.

Figure 1:
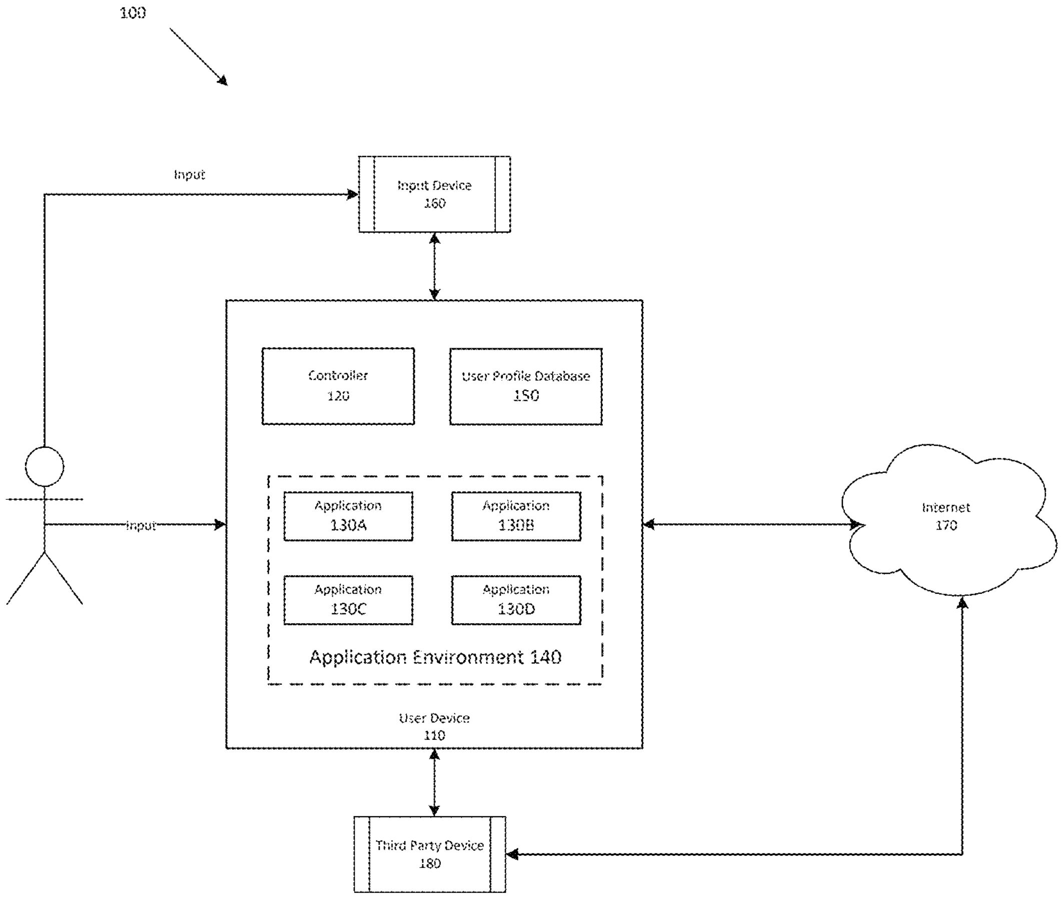
FIG. 1 is an exemplary embodiment of a system for application aware sequence generation and execution.

FIG. 1 illustrates a system 100 for application aware sequence generation and execution according to an exemplary embodiment. FIG. 1 includes a user device 110, an input device 160, a third-party device 180, and the Internet 170. The user device 110 includes a controller 120, an application environment 140 that includes one or more applications 130A, 130B, 130C, and 130D, and a user profile database 150.

User device 110 can include a mobile device such as a smart phone, a tablet computer, a laptop computer, a desktop computer, or any other computing device hosting a controller 120, one or more applications 130, and a user profile database 150. User device 110 can also detect and receive one or more user inputs from a user, such as via a touch screen, camera, microphone, buttons, or the like integrated with the user device 110, and from an input device 160, and communicate with at least the Internet 170 and a third parry device 180.

Controller 120 can be a client application, such as but not limited to a mobile application, a tablet application, a desktop application, or a smart watch application on or associated with user device 110. Controller 120 can analyze user input received by the user device 110, whether from the user on user device 110 or from an input device 160, to detect a command, the command comprising one or more parameters corresponding to a task to be executed by controller 120 on one or more applications 130 on user device 110 and/or on third party device 180. Controller 120 can analyze application environment 140 on user device 110 and communicate with the one or more applications 130 and/or third-party device 180 to execute one or more steps of a sequence. Controller 120 can communicate with Internet 170 to, for example, generate an application profile based at least in part on application environment 140 and one or more parameters of a command.

Application 130 can include any application on or associated with user device 110, including but not limited to, web browsers, word processors and text editors, gaming applications, spreadsheet and presentation applications, social media applications, and graphics and multimedia applications. While four applications 130A, 130B, 130C, and 130D are illustrated in system 100 of FIG. 1, any number of applications 130 may be present on user device 110 without departing from the scope of this disclosure.

Application environment 140 can describe the environment of applications present on user device 110. Application environment 140 is not limiting and includes all applications 130 on user device 110 whether an application 130 is actively running on user device 110, passively running, or installed but not running. Application environment 130 further includes applications associated with user device 110 even if not operating on user device 110.

User database profile 150 can include one or more user profiles corresponding to one or more users of the user device 110. Each user profile can include one or more command profiles that describe one or more commands mapping a user input to a mapped task to be performed at an application 130 of user device 110. User profiles and command profiles, as used in this disclosure, are described in U.S. Pat. Nos. 11,908,475 and 12,087,301, and in particular with refence to FIG. 5, the disclosures of which are incorporated by reference as if fully described herein.

Input device 160 can include a keyboard, mouse, pen, trackball, touch screen, or game controller, a voice input device (e.g. a microphone), a scanning device, a digital camera, remote control, or another device to which a user can provide a user input. Input device 160 can be operatively connected to user device 110, such as but not limited to, via a wired connection like a USB port and the like, or via a wireless connection like Bluetooth and the like. Input device 160 receives user input from a user and communicates the user input to user device 110. While only one input device 160 is illustrated in system 100 of FIG. 1, it will be appreciated that more than one input device 160 can be present in system 100.

User device 110 and third-party device 180 can be communicatively coupled to Internet 170 via WIFI or other wireless and wired connections.

Third party device 180 can be a laptop computer, desktop computer, tablet computer, mobile device, gaming console, or other computing device that can receive instructions from user device 110 corresponding to one or more steps of a sequence to be executed at third party device 180. The instructions received by third party device 180 can include one or more traditional HID (Human Interface Device) inputs, such as, but not limited to, keystrokes, button presses, joystick or mouse movements, and the like, as well as other instructions as discussed below that cause one or more steps of the sequence to be executed on third party device 180. Third-party device 180 can be operatively connected to user device 110, such as but not limited to, via a wired connection like a USB port and the like, or via a wireless connection like Bluetooth and the like. While only one third party device 180 is illustrated in system 100 of FIG. 1, it will be appreciated that more than one third party device 180 can be present in system 100.

Figure 2:
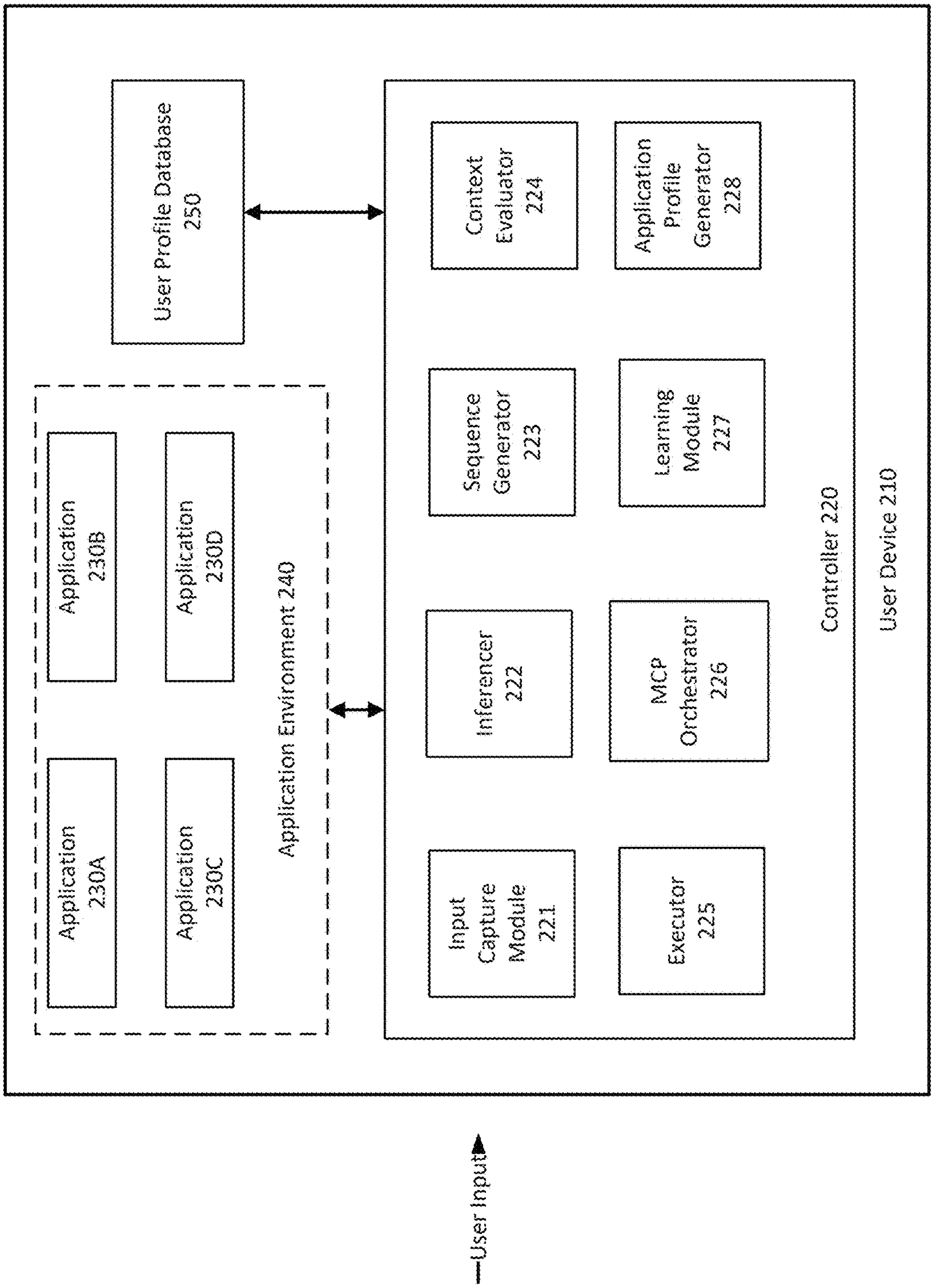
FIG. 2 is an exemplary embodiment of a user device user for application aware sequence generation and execution.

FIG. 2 illustrates a user device 210 that includes a controller 220, one or more applications 230, an application environment 240, and a user profile database 250 according to an exemplary embodiment.

As illustrated in FIG. 2, controller 220 includes an input capture module 221, an inferencer 222, a sequence generator 223, a context evaluator 224, an executor 225, an MCP (Model Context Protocol) orchestrator 226, and a learning module 227, each of which communicate via a shared orchestration layer. In this way, controller 220 can coordinate complex sequences by managing the interactions between input capture module 221, inferencer 222, sequence generator 223, context evaluator 224, executor 225, MCP orchestrator 226, learning module 227, and application profile generator 228.

Input capture module 221 ingests user input received by user device 210, such as, but not limited to, voice, sound, body movements, facial expressions, tilt and motion controls, and HID inputs, such as, but not limited to, keystrokes, button presses, and joystick or mouse movements, processes the received user input, and communicates processed user input to inferencer 222. These examples of user input received by user device 210 and ingested by input capture module 221 are non-limiting, and it will be appreciated that different types of user inputs can be received by user device 210 and ingested by input capture module 221.

Inferencer 222 analyzes the processed user input received from input capture module 221 using automatic speech recognition (ASR), natural language understanding (NLU), large language models (LLM), confidence gates, and other processes to detect a command from the user input received by user device 210 and identify one or more parameters of the command corresponding to one or more tasks to be executed. The ASR can be stored on the user device to enable processing on device and without an external network connection, such as a connection to the Internet. This enables low-latency speech recognition and improves data privacy by keeping all speech data on user device 210 for analysis.

Sequence generator 223 constructs sequences corresponding to detected commands based on application environment 240, one or more parameters of the detected commands, and one or more application profiles corresponding to one or more applications 230 in application environment 240, where each sequence includes one or more steps to be executed in one or more applications 230 and/or a third-party device, e.g., third party device 180.

Context evaluator 224 analyzes applications 230 on user device 210 for determining an application environment, e.g., application environment 240. For example, the application environment includes all applications and operating system elements actively running on the user device, all applications and operating system elements passively running on the user device, and all applications and operating system elements installed on the user device but not running at the time the application environment is determined.

Executor 225 executes the one or more steps of the sequence as output, such as but not limited to, HID controls, user interface actions, remote tasks at a third-party device, e.g., third party device 180, voice and text to speech, and large language model services. Executor 225 can further execute steps configured to request user intervention, such as AwaitUser requests whereby executor 225 pauses execution of a step of a sequence until a user provides requested user intervention via a user input; perform structured error handling for failed steps of a sequence including but not limited to detecting execution failures, categorizing failure types, and conditionally retrying, skipping, compensating, or aborting subsequent sequence steps based on predefined recovery logic; and generate user-interactive prompts configured to receive a selection corresponding to retrying the step, skipping the step, or terminating the sequence.

Executor 225 can further interact with and manipulate UI elements of applications, operating level elements, and third party device by retrieving all actionable UI elements, filtering by, for example, control type, interactivity, visibility, and support pattern, and executing actions via supported patterns, such as but not limited to Invoke, Value, and Selection. Executor 225 can cache these elements for use in executing steps of sequences and can enrich them with metadata. Executor 225 can further interact with UI elements of applications, operating level elements, and third party device by, for example, overlaying highlighting or other visual markers on target elements, moving keyboard or screen reader focus to targeted elements, and scrolling elements into view using native patterns.

Users can set permissions and other rules in a user profile that executor 225 can act on. For example, a user can define a blacklist in a user profile of applications, operating system elements, third party device, or actions that executor 225 cannot act on. Similarly, a user can define restrictions to limit execution of steps of a sequence to specific whitelisted control types and define actions where admin level intervention is required. Executor 225 can similarly identify sensitive elements in a step of a sequence, such as a password, a credit card number, and the like, and request user intervention to avoid unintended actions.

Executor 225 can execute multiple steps of a sequence and multiple sequences one after the other (i.e. in sequence) and in parallel by managing an execution queue for the sequences, tracking active HID states, pending user interface (UI) actions, and variable values. Executor 225 can also execute steps of a sequence remotely at third party devices, e.g. third-party device 180, through communication formats, such as but not limited to WebRTC (Web Real-Time Communication) and MCP orchestrator 226. Executor 225 further ensures compatibility and feasibility of the steps of a sequence with the current state of application environment 240, user device 210, and third-party devices 180.

MCP orchestrator 226 manages session state, tool exposure, policies and guidelines, and agent communication via a MCP server. MCP orchestrator 226 enables integration with external artificial intelligence agents, such as but not limited to Microsoft 365 Copilot, ChatGPT, or Claude, by serving as a secure, extensible middleware layer that exposes input capture module 221, inferencer 222, sequence generator 223, context evaluator 224, executor 225, learning module 227, and application profile generator 228 of controller 220 as callable tools to be executed locally on user device 210 via a persistent bidirectional device communication protocol, such as but not limited to a persistent SignalR connection and/or WebSockets. MCP orchestrator 226 receives commands from an external AI agent and passes those commands to input capture module 221 as a virtual input that input capture module 221 can then process.

MCP orchestrator 226 can be implemented as a orchestration component configured to expose one or more callable interfaces for invoking and coordinating execution across one or more client devices, that exposes input capture module 221, inferencer 222, sequence generator 223, context evaluator 224, executor 225, and learning module 227 of controller 220 via HTTP endpoints in order to support streamable HTTP, facilitating low-latency, bidirectional communication for real-time delivery of instructions to controller 220 via a WebSocket-based channel, and OpenAPI schema, which defines available tools and their parameters for MCP orchestrator 226. This architecture supports asynchronous, event-driven execution of commands and ensures that external AI agents can issue instructions without blocking or freezing.

MCP orchestrator 226 further manages user sessions and device connections, including authentications, such as OAuth2 tokens, to validate user identity and scope of use and device access, user-device mapping to ensure commands are directed to and performed at the correct device, which can include user device 210, action dispatch, which facilitates sending commands from an external AI agent via a persistent bidirectional device communication to controller 220 and its components for execution of the command and return of results to the corresponding external AI agent, and error handling, which logs failures and returns those failures to the external AI agent for feedback.

Learning module 227 analyzes outcome logs, user feedback, and system error reports to train ASR, NLU, and LLMs and improve performance in subsequent sequences. Learning module 227 can collect success and failure execution outcome results for different actions, sequences, steps within sequences, and commands and error type information identifying the characteristics of a failure, such as denial of an access permission, failure to locate a user interface element, or failure to open a desired application. Learning module 227 can further collect data corresponding to user intervention/corrections to a sequence, such as user manual overrides, commands to retry a failed action, and skipping steps in a sequence due to an initial failed attempt. To enrich this data further, learning module 227 can also collect contextual data for the preceding, such as application metadata, summaries of the user interface screen, and user input history. Learning module 227 can subsequently classify this data into structured categories for analysis and retraining.

Application profile generator 228 generates an application profile. Application profiles comprise the actions and default commands/training data used in a given application and in the operating system of user device 110. Application profiles may be pre-generated before a command is executed and stored in a local cache to be used to train an NLU/NLP model for generating sequences corresponding to user commands and performing the requisite steps of the sequence in an application corresponding to an application profile. Application profiles may be generated, for example, in accordance with the step of method 500 described herein with respect to FIG. 5.

User profile database 250 can include one or more user profiles corresponding to one or more users of the user device 210. Each user profile can include one or more command profiles that describe one or more commands mapping a user input to a mapped task to be performed at an application 230 of user device 210. User profiles and command profiles, as used in this disclosure, are described in U.S. Pat. Nos. 11,908,475 and 12,087,301, and in particular with refence to FIG. 5, the disclosures of which are incorporated by reference as if fully described herein. Controller 220 can retrieve a user profile from user profile database 250 and update the user profile with user data reflecting usage patterns, user feedback, and the like.

Controller 220 runs entirely on user device 210 and does not rely on a network connection for any processing, enabling use even in places with weak or no network connection. By performing all tasks on device, including but not limited to inferencing, NLU and NLP, sequence construction, task execution, etc., controller 220 operates deterministically and with low latency. Moreover, by performing all tasks locally on device without the need for a network connection, data privacy is improved, as personal data does not traverse a network connection where bad actors can intercept it.

Figure 3A:
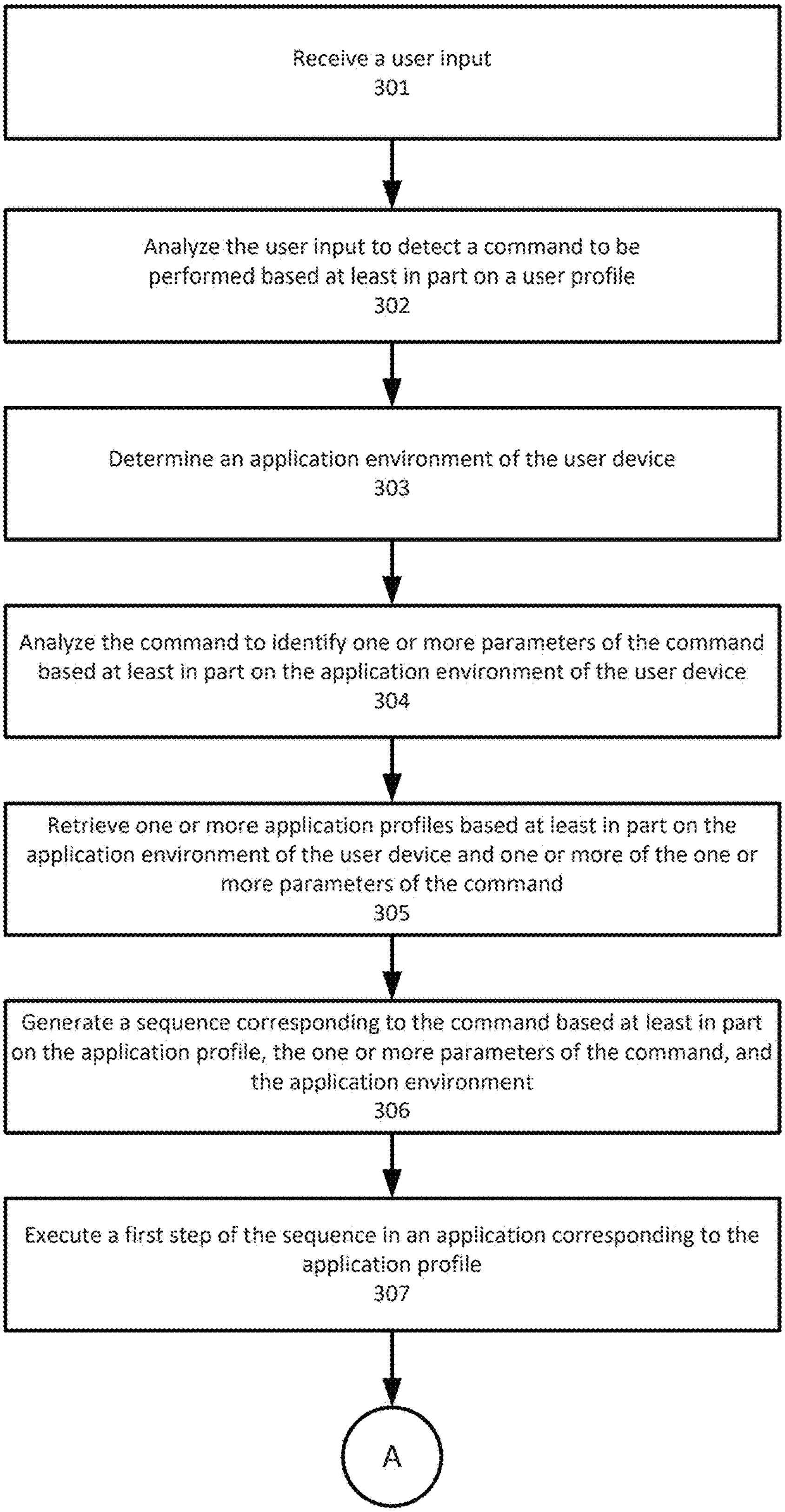
FIGS. 3A and 3B are a flow chart of an exemplary embodiment of a method for application aware sequence execution.
Figure 3B:
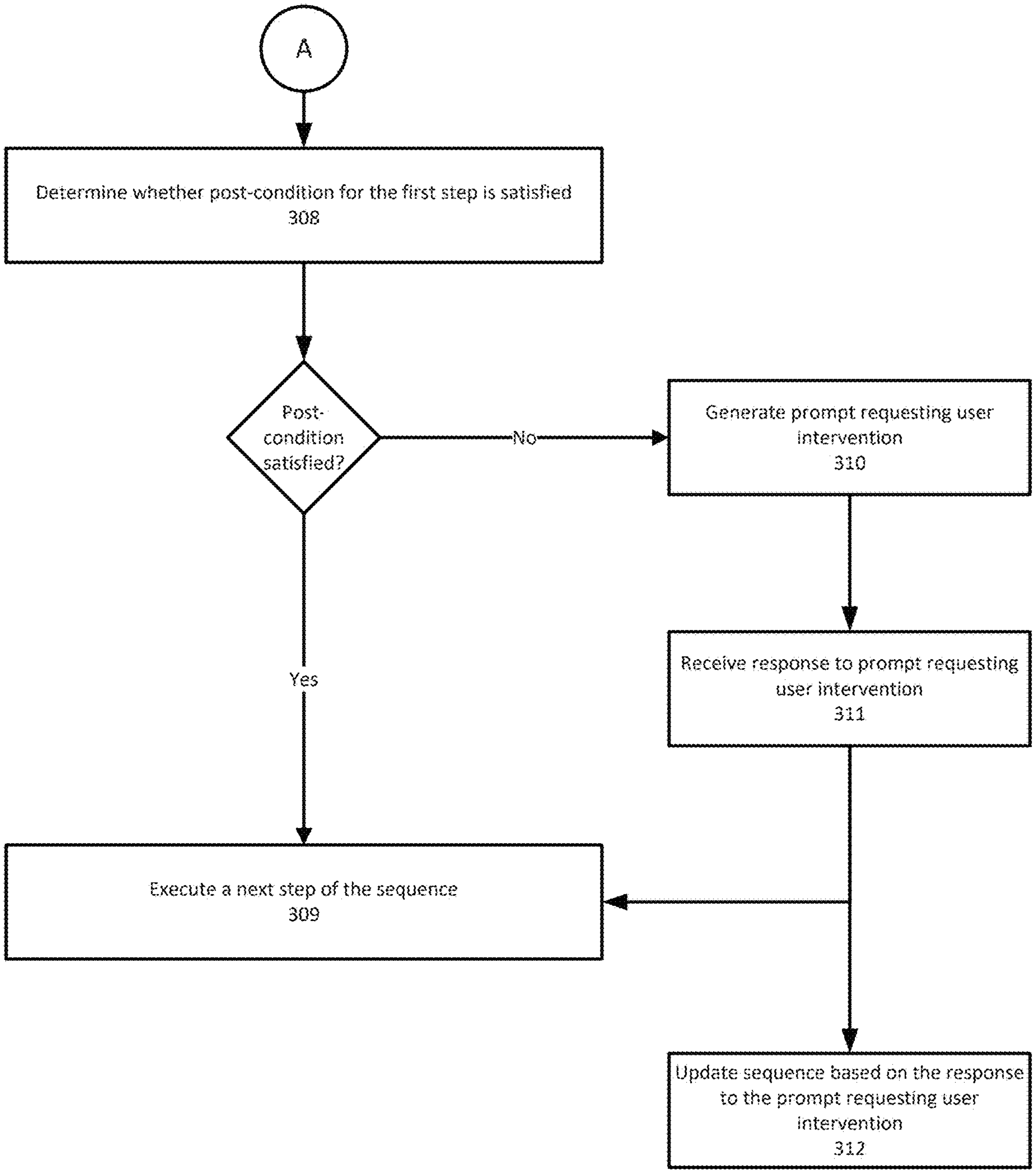

FIG. 3 illustrates a flow chart for executing an application aware sequence according to exemplary embodiments of this disclosure. At step 301, user input is received. Receiving user input may include a controller, e.g., controller 120, 220, receiving user input from an input device, e.g., user device 110, 210, and input device 160. The user input may include audio data corresponding to speech, sounds such as clapping and snapping, and other noise, HID inputs, such as but not limited to, keystrokes and mouse movements, video data corresponding to body and/or facial movement of a user, an object, and the like, tilt and/or movement of the input device (e.g., as detected via gyroscopes or accelerometers), and other inputs. The user input may further include a combination of user inputs making up a message or request. For example, the user input may include a message typed by a user, such as "book a flight to Japan."

At step 302, the user input is analyzed to detect one or more commands to be performed based at least in part on a user profile. Analyzing the user input can include the controller normalizing the user input.

When the user input includes audio data, the audio data can undergo coning to isolate speech of the user from other speech and sounds in the audio data as well as to isolate other sounds in the audio data, such as clapping and snapping that may correspond to a command defined in the user profile. Audio data can further be split into single channel mono-audio buffers to enable parallel processing. Characteristics of the audio data, including volume, clarity, and consistency are analyzed to determine which audio corresponds to the speech of the user, taking into account, for example, a distance that an audio source is from an input device from which audio data is received, a direction an audio source is facing relative to each input device, and other data regarding a spatial positioning of an audio source. Filters can be applied to the audio data to identify and remove background noise and filter overlapping speech from one another. The normalized audio data can then be processed by an ASR engine to convert the audio data to text corresponding to the detected command. Audio data may be even further analyzed for dictation phrases or vowel sounds and diphthongs that indicate a particular command (e.g., type "how are you", or an "ah" sound triggers a "type" command). Analyzing audio data to detect one or more commands can further include one or more of the steps of method 200 described in U.S. Pat. Nos. 11,908,475 and 12,087,301, the disclosures of which are incorporated by reference as if fully described herein.

When the user input includes video data, changes in landmark points and pose positions of the user are monitored by the controller to determine whether one or more changes correspond to a command. Monitoring video data for changes in landmark points and pose positions of the user to determine whether one or more changes correspond to a command can include one or more of the steps of method 700 described in U.S. Pat. Nos. 11,908,475 and 12,087,301.

When the user input includes device tilt or motion data of an input device, the data is filtered and mapped by the controller to directional vectors. Momentum prediction algorithms can be used to supplement device tilt or motion data with a low frame rate with interpolated movement data.

When the user data includes HID inputs, corresponding HID reports are analyzed against a user profile corresponding to the user to determine mapping of the HID input one or more commands.

At step 303, an application environment of the user device is determined. As used herein, an application environment refers to the composition of applications and operating system elements of the user device and the status/state of said applications and operating system elements at the time the application environment is determined.

Figure 4:
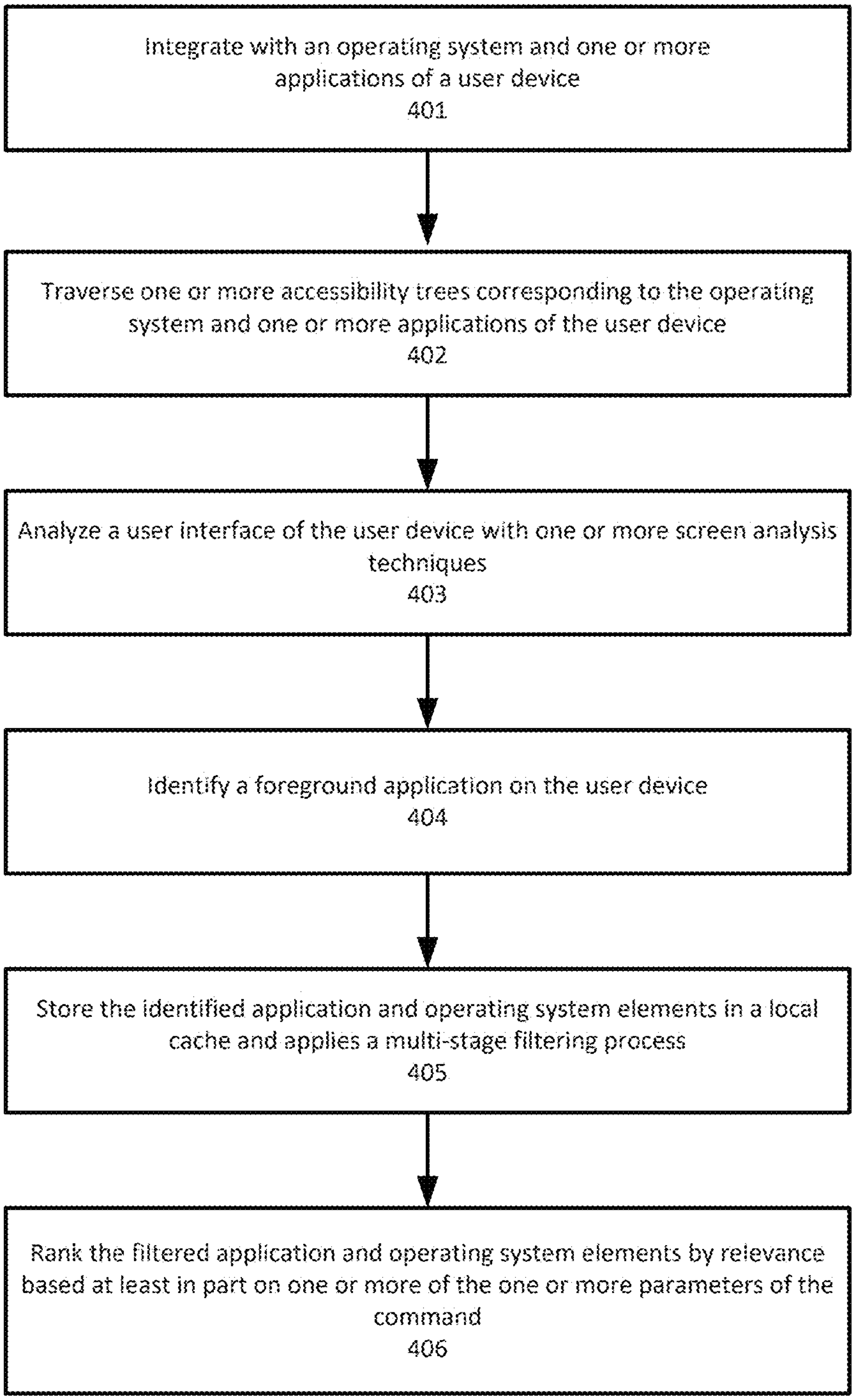
FIG. 4 is a flow chart of an exemplary embodiment of a method for generating an application environment.

A method 400 for determining an application environment is described with reference to the flow chart in FIG. 4. At step 401, the controller, e.g. controller 120, 220, integrates with an operating system of a user device, e.g. user device 210, and one or more applications, e.g. applications 230, of the user device via native accessibility interfaces, allowing context evaluator 224 to analyze the applications 230 and operating system on user device 210 and identify elements within the applications 230 and the operating system. This can include integrating with all applications and operating system elements actively running on the user device, all applications and operating system elements passively running on the user device, and all applications and operating system elements installed on the user device but not running at the time the application environment is determined. In some implementations, the accessibility interfaces are accessed via platform-specific native modules exposed through a shared abstraction layer. For example, and without limitation, Windows UIA and macOS AX API can be accessed through platform-specific native modules, such as but not limited to [C++], [Objective-C++], wrapped in a shared interface.

At step 402, the controller traverses one or more accessibility trees corresponding to the operating system and one or more applications 230 of the user device 210. This can include traversing one or more accessibility trees across a single application 230, multiple applications 230, and/or operating system-level elements, such as file management systems, I/O device management, and security, to identify elements within the applications 230 and the operating system.

At step 403, to identify additional application and operating system level elements, the controller analyzes a user interface of the user device with one or more screen analysis techniques. This can include applying known screen analysis technique, including but not limited to, Optical Character Recognition (OCR) to extract text from user interfaces rendered on user device 210 and segmentation to identify visual boundaries and clusters of user interface components on user device 210, to identify additional application and operating system level elements.

At step 404, the controller identifies a foreground application on the user device 210 by identifying the application currently in focus on the user device, including identifying the tab, window, or other element of the foreground application that is current in focus. Identifying a foreground application can further include identifying one or more background applications that are not currently in focus on the user device.

At step 405, the controller stores identified application and operating system elements in a local cache and applies a multi-stage filtering process to the identified application and operating system elements in the local cache. The multi-stage filtering process can include, for example, filtering the identified application and operating system elements based on one or more of, without limitation, control type (e.g. button, slider), interactivity (e.g. IsEnabled, IsKeyboardFocusable), or supported patterns (e.g., Invoke, Value, Selection). The multi-stage filtering process can also include scope filtering to denote the identified application and operating system elements to, for example, application, operating system, or window level elements and property filtering that matches identified application and operating system elements by a common property, such as but not limited to, name, role, visibility, and interactivity. The multi-stage filtering process can further include metadata enrichment through an NLU model to, for example, add spoken synonyms, and additional semantic attributes, and confidence boosts for voice targeting. The multi-stage filtering process can further include adding security flags to sensitive application or operating system level elements, such as password or credit card number fields, to prevent unintended actions during execution of a sequence and applying user generated restrictions.

At step 406, the controller ranks the filtered application and operating system elements by relevance, based at least in part on the one or more parameters of the command. This can include context evaluator 224 using heuristics such as, but not limited to, screen position, visibility, and match strength to rank the filtered elements from most relevant to least relevant to one or more parameters of the command.

At step 304, the detected command is analyzed, based at least in part on the application environment of the user device, to identify one or more parameters of the command. A parameter of the one or more parameters of the command can include one or more intents of the command and one or more constraints of the command. Analyzing the detected command to identify one or more parameters of the command can include the controller using an NLU model to identify the one or more parameters of the command. The NLU model can utilize a combination of rule-based parsing and neural models, such as BERT (bidirectional encoder representations from transformers) for context-aware interpretation of the command, taking into consideration the application environment when analyzing the command. By taking into account the application environment, which as discussed above includes data concerning the applications on the user device, which applications are open, which applications are in the foreground, present UI elements and other OCR information, and more, the NLU model identifies parameters in context, rather than based solely on static command mappings or hardcoded UI elements, to improve accuracy and coverage in identifying parameters of the command.

Analyzing the detected command to identify one or more parameters can include the controller extracting an intent of the command. An intent of a command can be explicit or goal oriented. An explicit intent describes a direct action to be performed on the user device or a third-party device, and commands corresponding to the explicit intent describe the computing action to be performed on the user device or a third-party device. For example, an explicit intent may include "press enter" or "click save." Extracting an explicit intent can include identifying direct mappings to known commands based on exact matching or based on fuzzy matching by using phonetic and semantic similarity to identify known commands matching the explicit intent. A goal-oriented intent, in contrast, describes a high-level goal that is not a description of a direct action to be performed and instead comprises a series of computing actions required to achieve that goal. For example, a goal-oriented intent may be a high-level goal, such as "book a flight from Boston to Seattle" that does not map to a direct action. A goal-oriented intent may also include a combination of high-level goals and direct actions, such as "start a new document with a product requirements template for the new user dashboard feature," which includes a direct action of "start a new document" but with high-level goals of "with a products requirement template for the new user dashboard feature." Identifying an intent and classifying the intent as explicit or goal oriented is based on the NLU output, historical usage patterns of the user on the user device, the presence of known intents matching or relating to the extracted intent, and confidence thresholds of the intent. In some instances, for example where confidence of an identified intent is below a threshold value or where no intent can be identified, the user may be issued a prompt requesting clarification or suggesting alternative intents for the user to select.

Analyzing the detected command to identify one or more parameters can further include the controller identifying one or more constraints of the command. This may include a restriction on how the command is executed. For example, a constraint may identify a specific application to be used to execute the command or one or more tasks of the command (e.g. for the command "open a new document in Word," the constraint is to use the Word application to open the new document). As another example, a command related to translating text to a specific language may include a constraint identifying the output language.

At step 305, an application profile is retrieved based at least in part on the application environment and one or more of the one or more parameters of the command. This can include the controller retrieving an application profile from an application, e.g. applications 130, 230, corresponding to an application in the application environment, e.g. application environment 240, that can be used to execute the command based on the one or more parameters of the command. In particular, the application profile can be retrieved from the API of an application. Once retrieved, the application profile can be stored in a local cache of controller 220.

For example, for a command that includes an explicit intent to open a new document, an application profile for an application in the application environment that can be used as a text editor can be retrieved because the text editor can be used to execute the command based on its intent. As another example, for a command that includes a goal-oriented intent of "book a flight from Boston to Seattle," an application profile for an application in the application environment that can be used to search for flights, such as a web browser or a travel booking application, can be retrieved. All application profiles corresponding to applications in the application environment can be searched to identify an application profile that matches a user intent.

Where the application environment includes more than one application in which the command can be performed, the application profile can further be retrieved based upon past usage data, where an application profile corresponding to the most frequently used text editor can be selected. Where no such past usage data exists, a prompt may be generated for a user to select an application profile from a list of application profiles corresponding to the more than one applications in which the command can be performed. Alternatively, an application profile may be selected based on a default setting or other user preference setting. For example, historic sequences for previously performed for similar intents can be referenced and leveraged for retrieving the application profile. In such instances, an application profile corresponding to an application previously used to execute a command with a similar intent may be selected over an application corresponding to an application that has not previously been used to execute a command with a similar intent.

Additionally, where the application environment includes more than one application in which the command can be performed, the application profile can further be retrieved based upon current application usage in the application environment. For example, where more than one text editor application exists in the application environment, the controller can retrieve an application profile corresponding to a text editor application that currently open in the application environment. However if the user command specifies a text editor application in the application environment that is closed and a different text editor application is open in the application environment, then the controller can retrieve the application profile for the text editor application corresponding to the text edit application specified by the user command.

Where no application profile exists for a particular application in the application environment to be used to perform a command, an application profile can be generated and then retrieved.

An exemplary method 500 for generating one or more application profiles based at least in part on the application environment and one or more of the one or more parameters of the command is described with reference to FIG. 5.

Figure 5:
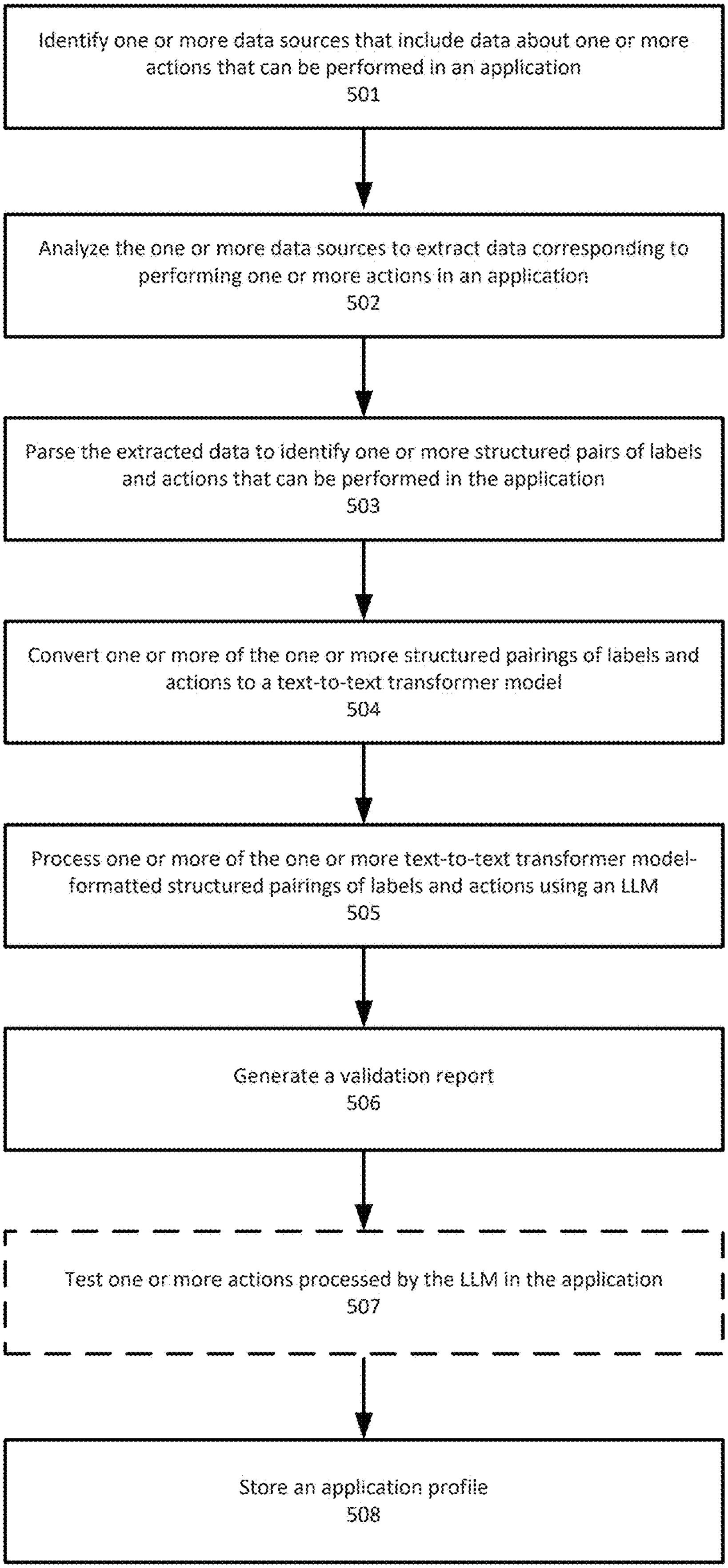
FIG. 5 is a flow chart of an exemplary embodiment of a method for generating an application profile.

As illustrated in FIG. 5, step 501 of method 500 includes identifying one or more data sources that include data about one or more navigation and/or keyboard actions that can be performed in an application. Data sources can include, but are not limited to, websites, URLs, application endpoints, locally stored files, and the like. Identifying one or more data sources can include generating application-specific search queries, resolving data sources from application help metadata or documentation references, and selecting data sources associated with the active application, detected features, or user-requested actions. The data sources can be discovered dynamically based on application identifiers, application state, or known documentation endpoints, and can be accessed to extract structured or semi-structured information describing supported navigation or keyboard actions.

At step 502, the one or more websites data sources are analyzed to extract data corresponding to performing one or more actions in the application. This can include the controller using parsing tools and structured content analysis to process pages or responses from the data sources, such as by traversing through multiple sections or nested content, for data corresponding to the actions that can be performed in the application and how to perform them.

For example, the controller can use tools such as Beautiful Soup and HTML Semantic DOM Breakdown to parse one or more webpages of one or more websites for data corresponding to the actions that can be performed in the application and how to perform them. This can include identifying the command path for performing an action and identifying shortcut keyboard mappings for actions, which can be operating system specific. Analyzing the one or more data sources can further include analyzing all webpages and child pages of one or more websites to extract data corresponding to performing actions in the application. For example, a website with information concerning a text-editor application on the user device may explain that to save a file, a user must click the "File" button in the user interface tool bar and then select the "Save" button. The website may also indicate that the keyboard shortcut for saving a file with a Windows OS as clicking the Control key and the letter "S" simultaneously. This information may be extracted and used to generate the application profile for this text-editor application on the user device, and specifically to define the "Save" action and corresponding keyboard shortcut in the application profile.

At step 503, the extracted data from the one or more analyzed data sources is parsed to identify one or more structured pairs of labels and actions that can be performed in the application. This can include the controller parsing the extracted data to identify one or more keyboard shortcuts, navigation details, page names, action names, and the like, that correspond to actions that can be performed in the application and identifying an associated action label. Parsing the extracted data can further include breaking down compound actions into their component parts as structured pairings of labels and actions. For example, a keyboard shortcut of "Move Cursor—Arrow Keys" for an application can be broken down into its components parts, namely: Move Cursor (left)—left arrow key; Move Cursor (right)—right arrow key; Move Cursor (up)—up arrow key; Move Cursor (down)—down arrow key. Similarly, a compound action of "Change Playback Time: Rewind or Forward" can be broken down into "Change Playback Time (Rewind): Rewind" and "Change Playback Time (Forward): Forward."

At step 504, one or more of the one or more structured pairings of labels and actions are converted to a text-to-text transformer model by the controller. These text-to-text transformer model-formatted structured pairings represent shorter summaries that are a consistent format, making digestion and analysis by the LLM faster and more accurate. These text-to-text transformer model-formatted structured pairings further simplify corresponding voice commands, making it easier for a user to provide a command that matches a pairing. Similarly, these text-to-text transformer model-formatted structured pairings present consistent formatting for key bindings for execution of the steps of a sequence. For example, a structured label and action pairing of "show context menu: double click" can be converted to the text-to-text transformer model format of "show context menu: [mouse_button_1, mouse_button_1]". Step 504 can further include saving the text-to-text transformer model-formatted structured pairings in a computer readable file, such as a CSV, with information about the application and source data corresponding to the source of the extracted data, including but not limited to, application name, website URL, created date, modified date, section name, action, OS type, and the like. As the structured pairings of labels and actions are converted to a text-to-text transformer model, data validation can be performed whereby duplicate pairings and empty pairings can be removed, and whereby pairings comprising similar actions can be combined into a single text-to-text transformer model-formatted structured pairing.

At step 505, one or more of the one or more text-to-text transformer model-formatted structured pairings of labels and actions can be processed by an LLM on the controller. This can include feeding an output CSV file, or other similar file type, containing one or more of the one or more text-to-text transformer model-formatted structured pairings of labels and actions into an LLM for processing. The LLM can, for example, simplify the actions and generate one or more corresponding voice commands. For example, an action of "copy item" can be simplified by the LLM to an action name of"copy," and the LLM can generate a corresponding voice command of "copy." As an additional example, an action of "move selected item (left)" can be simplified by the LLM to an action name of "move item (left)," and the LLM can generate corresponding voice commands of "move left" and/or "item left." Generating one or more voice commands can include converting numbers to pronounced versions of the number, e.g., "1" is converted to "one." If the LLM fails to process a text-to-text transformer model-formatted structured pairing of labels and actions, it can assign a tag indicating the pairing needs review.

Performing step 505 can further include the LLM using transformer-based language models, such as but not limited to T5, that consider user and user-device specific data in processing the text-to-text transformer model-formatted structured pairings of labels and actions, including historical user voice command patterns, application-specific macros and shortcuts, screen summaries and user interface element metadata of the user device, and historical sequences of the user.

Step 505 can further include the LLM using pattern matching to associate the actions from one or more of the simplified text-to-text transformer model-formatted structured pairings with other types of user input, such as face and head movement, virtual buttons, and motion controls. For example, if a simplified text-to-text transformer model-formatted structured pairing action is "move cursor (left)" with a corresponding voice command of "cursor left," the LLM can use pattern matching to associate this pairing with a head movement action of "head_tilt_left", a virtual button action of "hotkey_move cursor (left)", a face movement action of "eyes_look_left", or a motion control action of "tilt_left".

Step 505 can further include the LLM associating the text-to-text transformer model-formatted structured pairings with the corresponding application. For example, an output CSV containing text-to-text transformer model-formatted structured pairings for a text editor application can be associated with the corresponding text editor application.

Step 505 can further include transforming one or more of the text-to-text transformer model-formatted structured pairings to operating system specific pairings, such as by transforming an action in a pairing to the corresponding operating system input, e.g., a key stroke. The LLM can output separate files, such as json files, for different operating systems with the operating system specific pairings in each for a given application. While described herein as a json file, the output file from the LLM can be any acceptable file format, such as but not limited to, csv, xml, yaml, toon.

At step 506, a validation report can be generated by the controller. The validation report identifies anomalies and excesses, such as duplicate multi-modal commands, duplicate actions, empty commands or actions, and misalignment between controls and commands. The validation report can be reviewed, such as manually by a human or by an autonomous system, to check the actions identified in the validation report as errors, and adjust/correct the data as necessary.

Optionally, at step 507, one or more of the actions processed by the LLM can be tested by the controller in the application to ensure proper function. Any remaining errors can be corrected with adjustments to the data in the actions on the output file, e.g. the output json file.

At step 508, the output file form the LLM, including adjustments and corrections performed based on the validation report and/or the testing, is stored by the controller as an application profile in the API of the corresponding application, e.g. application 130, 230, in the application environment, e.g. application environment 140, 240, on the user device, e.g. user device 110, 210. Once saved, newly-generated application profile can be retrieved by the controller to perform execute a command as described in method 300 with respect to FIG. 3.

Returning to method 300 described with reference to FIG. 3, at step 306, one or more sequences corresponding to the command is generated based at least in part on the application profile and the one or more parameters of the command.

Figure 6:
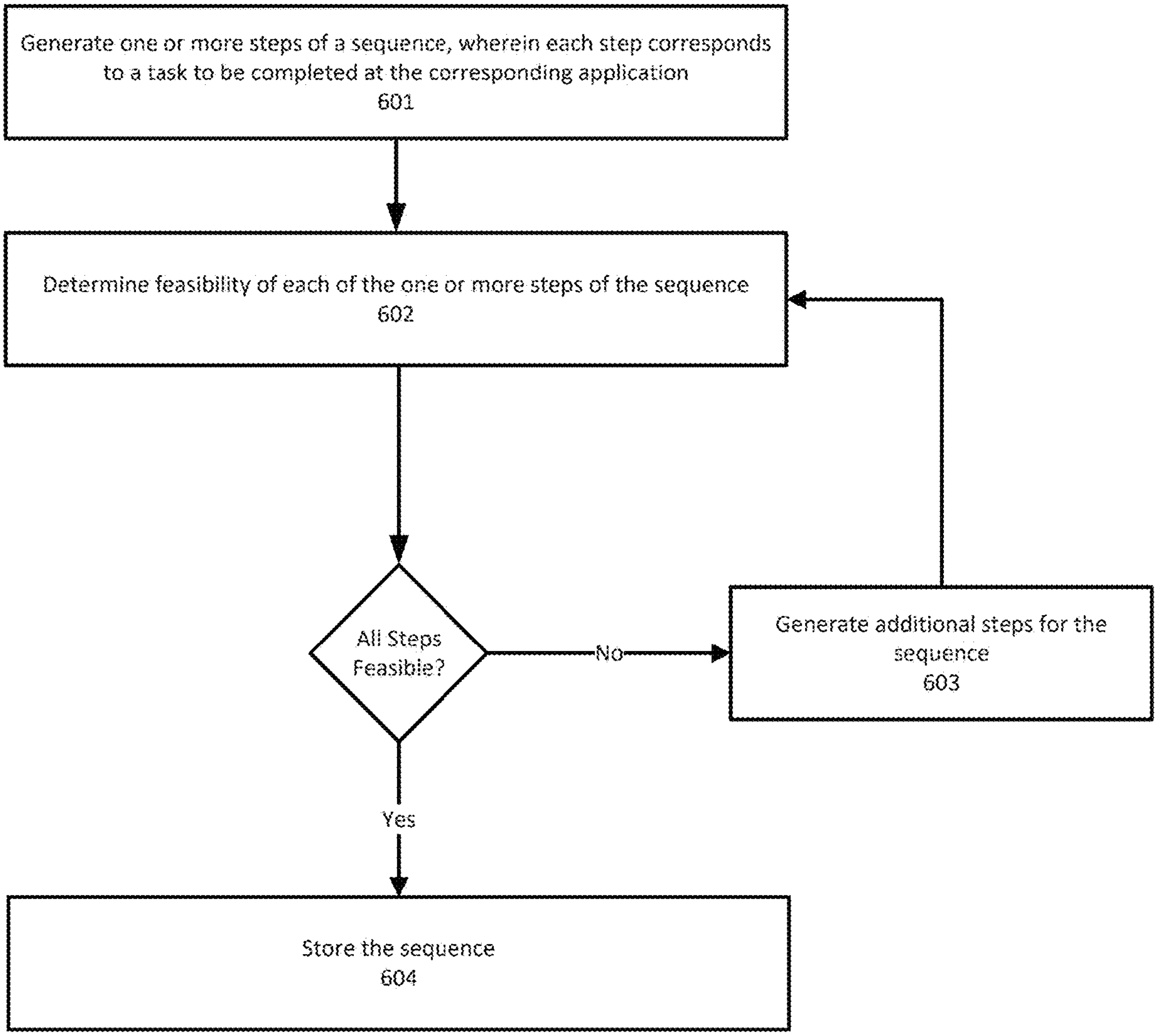
FIG. 6 is a flow chart of an exemplary embodiment of a method for generating a sequence.

An exemplary method 600 for generating one or more sequences corresponding to the command based at least in part on the application profile, the one or more parameters of the command, and the application environment is described with reference to FIG. 6.

At step 601, one or more steps of a sequence are generated. The steps of the sequence can be determined by an LLM of the controller considering the parameters of the user command, including the intent of the user command and any constraints of the user command, as the retrieved application profile, including the available actions in the application profile as described above with respect to method 500. Each step of the sequence corresponds to a discrete event to be executed on the user device, including but not limited to in the application within the application environment on the user device corresponding to the retrieved application profile, or at a third-party device in order to execute the user command. The discrete event to be executed can include, but is not limited to: HID actions, such as but not limited to, keystrokes, mouse movements, clicks, and scrolls, joystick movements, button presses, and the like; profile actions, such as changing user profiles or performing a command defined in a user profile; operating system level invocations, such as opening and closing applications and operating system commands; remote actions to third party devices, such as API calls, webRTC controls, or other third party device specific actions; audio test-to-speech (TTS), such as playing audio and read aloud features; timing actions, such as pause, wait for UIA state, awaitInput user, and awaitSilence which can detect the absence of speech, motion, mouse or cursor movement, and other input formats corresponding to intentional pauses or completion of an input; AI generation, such as generate text and MCP calls; UI automation actions, such as scrolling, invoking an element, or focusing on an element; input device controls, such as start/stop microphone or camera, or dictation; and viable actions, such as inputting text or numbers, generating an AI prompt, or highlighting.

For example, if a user command includes a parameter that is an explicit intent to open a new document and an application profile for a text editor application has been retrieved, the LLM may generate a sequence comprising steps of opening a new document in the text editor using a corresponding action for opening a new document as defined in the retrieved application profile for the text editor application, such as a keyboard shortcut corresponding to open new document (e.g., ctrl+"N").

As another example, is a user command includes a parameter that is a goal-oriented intent of "book a flight from Boston to Seattle" and an application profile for a travel booking application in the application environment was retrieved, the LLM may generate a sequence comprising steps of navigating to a fillable form field for the departure city, typing "Boston" into the fillable form field for the departure location, selecting the fillable form field for the arrival city, and typing "Seattle" into the fillable form field for the arrival location. In this example scenario, the constrains of the command only identify the departure and arrival locations, but leave out other information required to book a flight, such as, but not limited to, a date of the flight, whether it is one-way or round-trip, how many passengers are being booked for the flight, and personal information about the passengers. In such scenarios, the LLM generates a step at the end of the sequence being generated in step 601 that includes a prompt to the user requesting additional information identified in the application environment needed for the LLM to continue. Once the LLM receives the requested information from the user, it can generate an additional sequence to continue executing the command. Continuing with the example of a user command that includes a parameter that is a goal-oriented intent of "book a flight from Boston to Seattle," the sequence may end with a step of generating a prompt to the user requesting additional information identified in the user interface window in which the fillable form field of the departure and arrival city are. For example, where the user interface window includes form fields for whether the flight is one-way or round trip, form fields for the departure and return date, and a form field for the number of passengers, the sequence may include a step of generating a user prompt requesting this information from the user. Once the user provides that information in response to the prompt, the LLM can generate a second sequence comprising additional steps to execute the command, such as navigating to and entering the requested information in the form fields, selecting a "search" button (or other similar button to search for flights), and identifying one or more candidate flights. At this stage, an additional user prompt is required to select the particular flight to book, and subsequent steps in the booking process, like providing personal identifying information, will follow the same process of prompting the user for necessary information and generating sequences until further information is required by the LLM continues.

At step 602, the feasibility of executing each of the one or more steps of the sequence is determined. This includes the controller analyzing the application environment to determine whether each of the steps of the sequence can be performed within the application environment. For example, in the text editor example from above, if the text editor application is not open on the user device, the step from the sequence of opening a new document in the text editor application is not feasible. As a result, the sequence returns to the LLM where the LLM can execute step 603 and generate additional steps for the sequence to make each of the steps of the sequence feasible. Similarly, using the example above about booking a flight, if the travel booking application corresponding to the retrieved application profile is not open, the sequence returns to the LLM where the LLM can execute step 603 and generate additional steps for the sequence to make each of the steps of the sequence feasible.

If executing each of the one or more steps is determined to be feasible, then method 600 continues to step 604. For example, if the text editor application or the travel booking application are open on the user device, then the sequence is stored (step 604 of method 600).

At step 603, additional steps for the sequence can be generated by the controller to enable feasibility of each of the steps of the sequence. Using the examples from above, the LLM can generate an additional step in the sequence to open/launch the text editor application or the travel booking application, making the subsequent steps feasible. Similarly, if the text editor application or the travel booking application is open on the user device but is not the foreground application, the LLM can generate an initial step of navigating the mouse or cursor on the user device to the window corresponding to the text editor application in the user interface of the user device and clicking the window to bring it to the foreground. After generating these additional steps, the method returns to step 602 and determines the feasibility of each of the one or more steps of the sequence, including these additional steps.

If each of the one or more steps of the sequence is determined to be feasible, then method 600 continues to step 604.

At step 604, the sequence is stored. This can include storing the sequence as an intermediate representation (IR) data structure in a local IR database. The sequence may be stored, for example and without limitation, in volatile memory, persistent storage local to the user device, or one or more remote storage locations that enable reuse or sharing. In some implementations, the sequence may be designated as shareable and made accessible to other users or devices. The storage location of the sequence may be selected based on user preferences or policy constraints.

While method 600 of generating a sequence was described herein with respect to a single intent and a single sequence, it will be appreciated that method 600 can be performed to generate more than one sequence based on more than one intent from a command. For example, a user command requesting initiation of a live stream of a video game may be analyzed to identify a first intent associated with starting a streaming service and a second intent associated with launching the video game. In response, the controller can generate a first sequence executed on a streaming device and a second sequence executed on a gaming device, with the sequences executed in parallel or in a defined sequence to satisfy the user command, according to method 600 described with reference to FIG. 6.

Returning to method 300 described with reference to FIG. 3, at step 307, a first step of the one or more steps of the sequence is executed in an application corresponding to the application profile.

Figure 7:
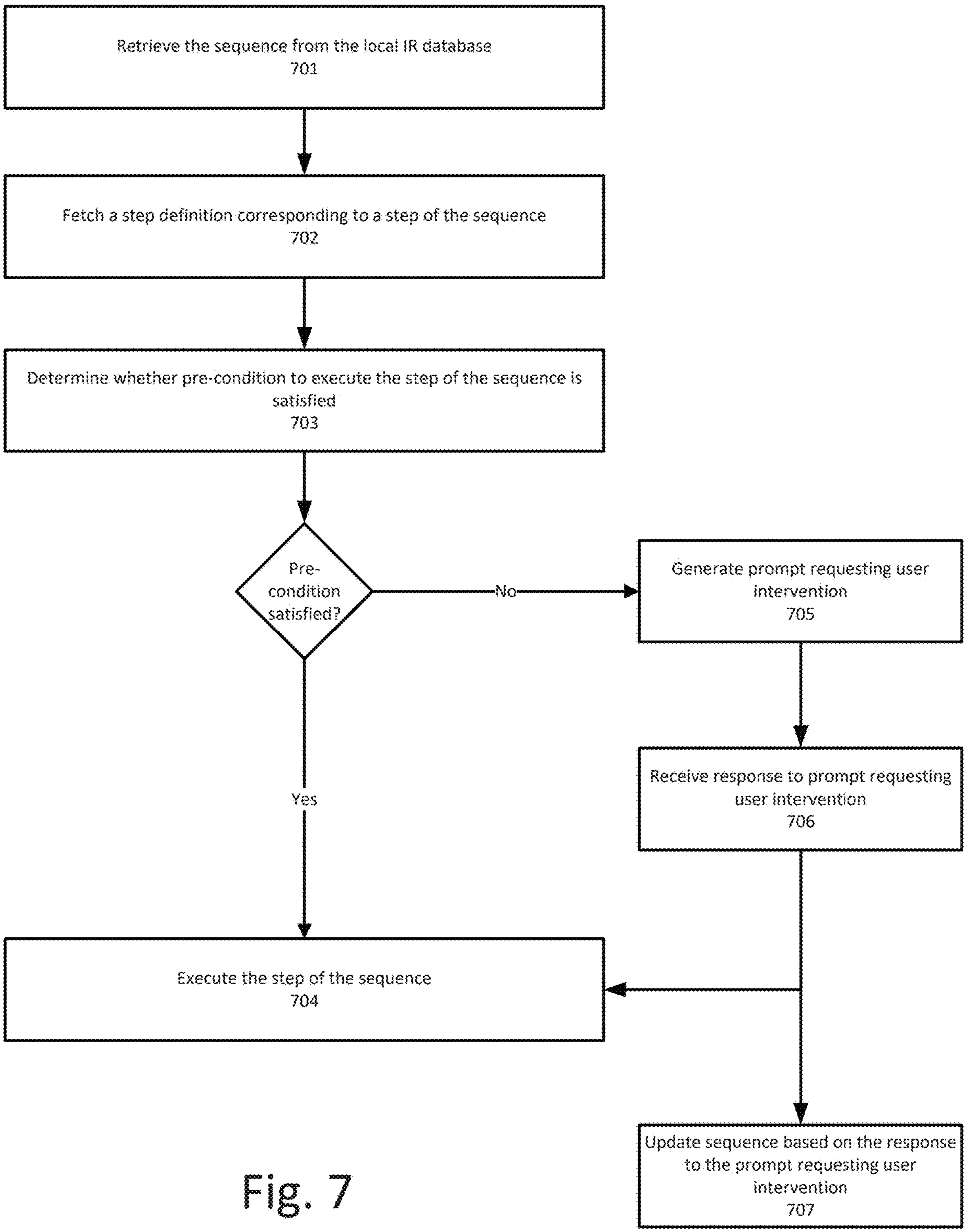
FIG. 7 is a flow of an exemplary embodiment of a method for executing a step of a sequence.

A method 700 for executing a step of the sequence is described with reference to the flowchart illustrated in FIG. 7. This can include a first step of the sequence and any subsequent steps of a sequence containing more than one step. At step 701, the sequence is retrieved. This can include retrieving the sequence from a local IR database. Alternatively, the sequence can be retrieved from a local memory, local persistent storage, remote or cloud storage, or other locations.

At step 702, a step definition corresponding to the step of the sequence is fetched. Each step definition includes information about a given step in the sequence, including but not limited to one or more pre-conditions, one or more post-execution conditions, one or more actions to be performed, and one or more constraints.

At step 703, satisfaction of a pre-condition required to execute the step is determined. If the pre-condition required to execute the step is determined to be satisfied, then method 700 continues to step 704 and the step is executed. If the pre-condition required to execute the step is determined to be not satisfied, then method 700 continues to step 705 and a prompt requesting user intervention is generated. A pre-condition may be inherent, for example, an application must be running or installed to perform the step, explicitly defined by the user as part of the sequence or preferences, and or inferred by the LLM during sequence generation based on the requested action and required context.

At step 705, a prompt requesting user intervention based on determining the pre-condition required to execute the step is not satisfied is generated. This can include the controller generating a prompt requesting the user to provide a user input to perform an action that executes the step of the sequence.

At step 706, a response to the prompt requesting user intervention is received. This can include the controller receiving a response to the prompt in the form of a user input to perform an action that executes the step of the sequence. When the response is received, method 700 continues to step 704 to execute the step of the sequence and to step 707 to update the sequence based on the response to the prompt requesting user intervention.

At step 707, the sequence is updated based on the response to the prompt requesting user intervention. This can include updating the step in the sequence to include the action performed by the user in response to the prompt requesting user intervention. In this way, if the same sequence is called for execution at a later time, controller 220 can execute the step of the sequence according to the user intervention, ensuring satisfaction of the pre-condition in any subsequent performance of the step of the sequence.

At step 704 of method 700, the step of the sequence is executed. This can include the controller performing one or more actions defined in the step definition corresponding to the step of the sequence. For example, the controller can communicate one or more HID reports defining the one or more actions from the step definition to an application on the user device or to a third-party device associated with the step of the sequence that causes the one or more actions to be executed at the application on the user device or the third-party device.

Returning to method 300 described with reference to FIG. 3, at step 308, following execution of the first step of the sequence according to method 700, controller 220 can determine whether a post-execution condition is satisfied. A post-execution condition refers to an indication that the step of the sequence executed by the controller 220 was correctly executed. This can include controller 220 analyzing the application environment after execution of the first step of the sequence for an indication that the step was correctly executed. For example, if the first step of the sequence is to open a new document in a text editor application, then controller can analyze the application environment after execution of the first step of the sequence to determine whether a new document has been opened in the text editor application on the user device. The controller can use OCR and other screen analysis techniques to determine whether a new document has been opened in the text editor application on the user device. Similarly, the controller can receive a message, such as from an application in the application environment or a third-party device, confirming that the first step of the sequence was executed in that application or third-party device. If the controller determines that a new document in the text editor application is open, then the controller can determine that the post-execution condition is satisfied and proceed to step 309 of method 300.

If the controller determines that the new document in the text editor application has not been opened, then the controller can determine that the post-execution condition is not satisfied and proceed to step 310 of method 300. This can include the controller analyzing the application environment with OCR and other screen analysis techniques and determine that no new document has been opened in the text editor application. Similarly, this can include the controller analyzing the application environment and identifying an error message indicating that no new document was opened.

At step 310, a prompt is generated, the prompt requesting user intervention in response to the failure to determine the post-execution condition required to execute the first step is satisfied. This can include the controller generating a prompt requesting the user provide a user input to perform an action that executes the first step of the sequence.

At step 311, a response to the prompt requesting user intervention in response to the failure to determine the post-execution condition required to execute the first step is satisfied is received. This can include the controller receiving a response to the prompt in the form of a user input perform an action that executes the first step of the sequence. When the response is received, method 300 proceeds to step 309 to execute each of one or more subsequent steps of the sequence and to step 312 to update the sequence based on the response to the prompt requesting user intervention.

At step 312, the sequence is updated based on the response to the prompt requesting user intervention. This includes the controller updating the first step in the sequence to include the action performed by the user in response to the prompt requesting user intervention. In this way, if the same sequence is called for execution at a later time, the controller can execute the first step of the sequence according to the user intervention, ensuring satisfaction of the pre-condition in any subsequent performance of the first step of the sequence.

At step 309, a next step of the sequence is executed. This includes the controller executing each of any subsequent steps in the sequence according to method 700 described with reference to FIG. 7. As with the first step, after the next step is executed, the controller can further perform steps 308-312 for the next step. Each subsequent next step in the sequence can be executed according to this process until all steps in the sequence have been executed.

While method 300 is described with reference to a single sequence, more than one sequence can be executed in parallel following the same steps described there. Similarly, more than one step in a sequence can be executed in parallel with another step of the same sequence to the extent the steps do not have any interdependency.

Figure 8:
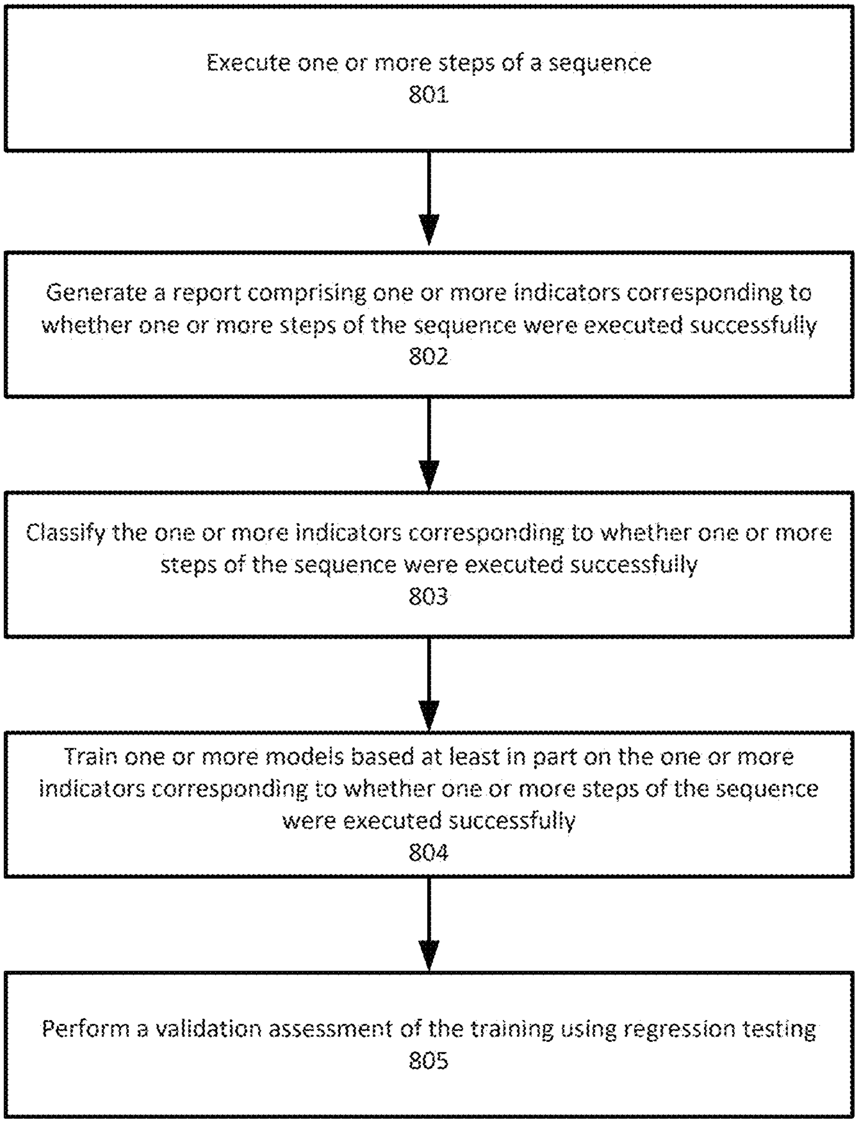
FIG. 8 is a flow chart of an exemplary embodiment of a method for continuous learning.

FIG. 8 illustrates a flow chart of a method 800 for continuous learning according to an exemplary embodiment.

At step 801, one or more steps of a sequence are executed. This can include the controller, e.g. controller 120, 220, executing one or more steps of a sequence according to methods 300 and 600 described above with reference to FIGS. 3 and 7, respectively.

At step 802, a feedback report comprising one or more indicators corresponding to whether one or more steps of the sequence were executed successfully is generated. This can include the controller analyzing the execution of the one or more steps of the sequence and identifying whether a step was successfully executed or not successfully executed. For example, for steps of the sequence for which a post-execution condition was determined not satisfied, as described with respect to step 308 of method 300, the controller can include in the report an indicator that the corresponding step of the sequence was not executed successfully. Similarly, the controller can include in the feedback report an indicator that the corresponding step of the sequence was executed successfully for steps of the sequence for which a post-execution condition was determined satisfied. The report can include information about the action performed that corresponds to each of the one or more steps of the sequence in the feedback report and associate each action with a respective indicator of whether the step was executed successfully. The controller can further include in the report corresponding metadata for each of the one or more steps of the sequence, including but not limited to the state of the application environment at the time of execution of the respective step, such as UI elements, active applications and operating system level elements, and the like, the application profile and an identification of the one or more processed text-to-text transformer model-formatted structured pairings of labels and actions from the application profile upon which the step of the sequence was based, the user profile and any command profiles or mappings used to execute the step of the sequence, and any user intervention required to execute the step of the sequence.

At step 803, each of the one or more indicators corresponding to whether one or more steps of the sequence were executed successfully is classified. This can include the controller analyzing the one or more indicators corresponding to whether one or more steps of the sequence were executed successfully and corresponding metadata into structured feedback categories. These structured feedback categories can include, but are not limited to: execution outcomes that indicate the success or failure of a step of a sequence, the whole sequence that an individual step is part of, and any actions performed as part of one or more steps of the sequence; error type, including but not limited to a denied permission to perform an action in a step of a sequence, failure to identify a UI element needed to execute the step of the sequence, whether an application needed to execute a step of a sequence was not open, whether a third-party device needed to execute a step of a sequence was not connected to or accessible by the controller, and the like; user corrections that indicate whether user intervention was required, which can include but is not limited to manual user overrides, retrying a step of a sequence, skipping a step of a sequence, and the like; and context which includes UI screen summaries, application metadata, user input history, and the like.

At step 804, one or more models are trained based at least in part on the feedback report comprising one or more indicators corresponding to whether one or more steps of the sequence were executed successfully. This can include training one or more of the ASR, NLU, and LLM with the indicators and corresponding metadata in the report, refining prompts, adjusting predictions based on phonetic and contextual similarity, and updating base models, such as T5 and BERT models, to improve accuracy of sequence generation and execution.

At step 805, a validation assessment is performed using regression testing. This can include, for example, executing the sequence from the first step to ensure the sequence can be completed without failure and/or without user intervention.

Figure 9:
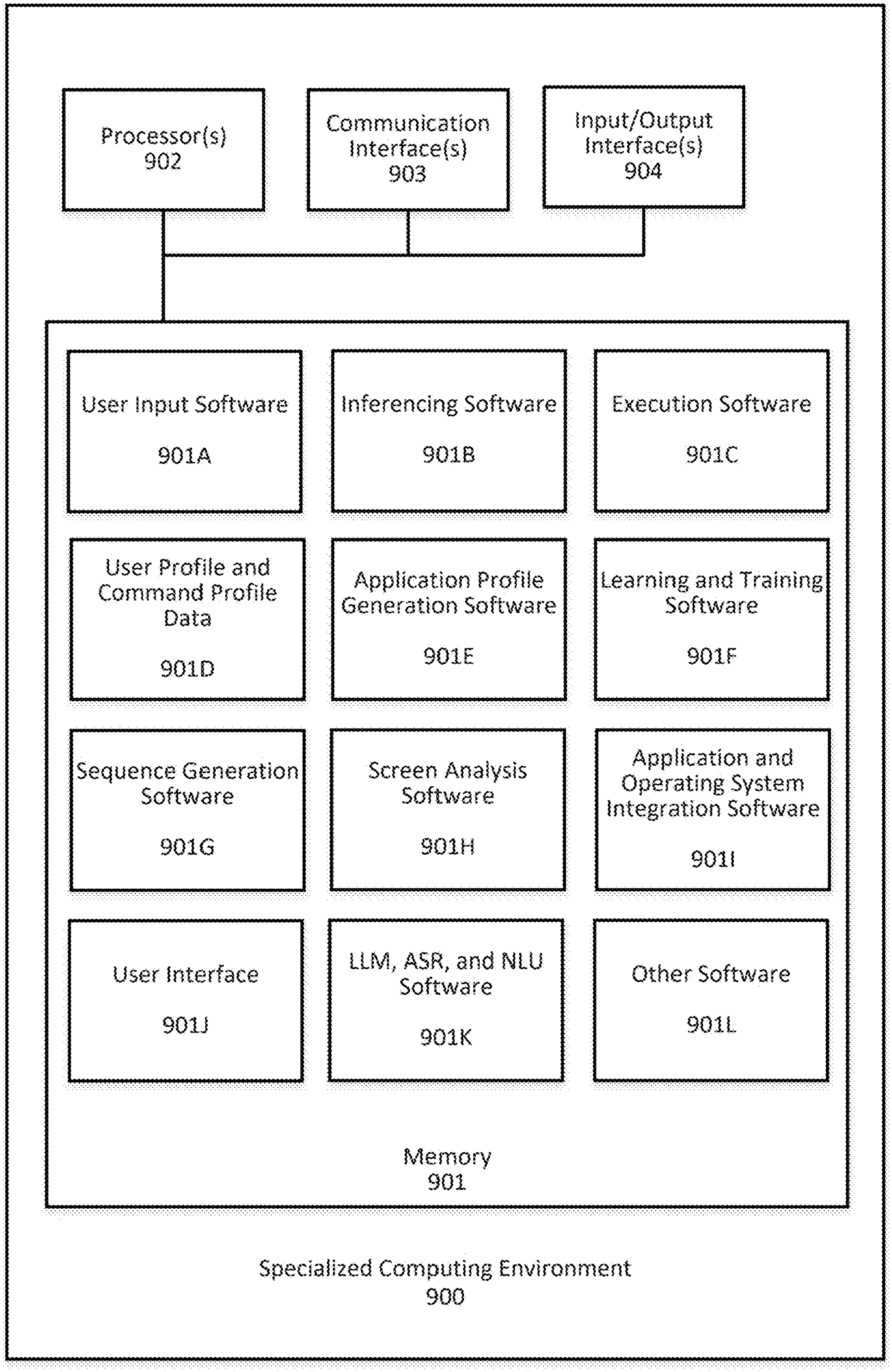
FIG. 9 illustrates the components of a specialized computing environment configured to perform the processes described herein.

FIG. 9 illustrates the components of a specialized computing environment 900 configured to perform the processes described herein. Specialized computing environment 900 is a computing device that includes a memory 901 that is a non-transitory computer-readable medium and can be volatile memory (e.g., registers, cache, RAM), non-volatile memory (e.g., ROM, EEPROM, flash memory, etc.), or some combination of the two. Specialized computing environment 900 can be an application client communicatively coupled with a user device, a third-party device, and an input device.

As shown in FIG. 9, memory 901 can store user input software 901A, inferencing software 901B, execution software 901C, user profile and command profile data 901D, application profile software 901E, learning software 901F, sequence generation software 901G, screen analysis software 901H, application and operating system integration software 901I, user interface 901J, LLM, ASR, and NLU software 901K, and other software 901L. Each of the software components in memory 901 store specialized instructions and data structures configured to perform the corresponding functionality and techniques described herein.

All of the software stored within memory 901 can be stored as computer-readable instructions, that when executed by one or more processors 902, cause the processors to perform the functionality described with respect to FIGS. 1-8.

Processor(s) 902 execute computer-executable instructions and can be real or virtual processors. In a multi-processing system, multiple processors or multicore processors can be used to execute computer-executable instructions to increase processing power and/or to execute certain software in parallel.

Specialized computing environment 900 additionally includes a communication interface 903, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 900 further includes input and output interfaces 904 that allow users (such as system administrators) to provide input to the system to display information, to edit data stored in memory 901, or to perform other administrative functions.

An interconnection mechanism (shown as a solid line in FIG. 9), such as a bus, controller, or network interconnects the components of the specialized computing environment 900.

Input and output interfaces 904 can be coupled to input and mapped devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 900.

Specialized computing environment 900 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 900.

Having described and illustrated the principles of the invention with reference to the described embodiment, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method comprising:

receiving, by at least one of one or more computing devices, a first user input;

analyzing, by at least one of the one or more computing devices and based at least in part on a user profile, the first user input to detect a command to be performed on a user device;

determining, by at least one of the one or more computing devices, an application environment of the user device based at least in part on traversing one or more accessibility trees corresponding to an operating system of the user device and one or more applications of the user device;

analyzing, by at least one of the one or more computing devices and based at least in part on the application environment of the user device, the command using a natural language understanding (NLU) model to identify one or more parameters of the command;

retrieving, by at least one of the one or more computing devices, an application profile based at least in part on the application environment of the user device and the one or more parameters of the command;

generating, by at least one of the one or more computing devices and based at least in part on the application profile and one or more of the one or more parameters of the command, a first sequence corresponding to the command, the sequence comprising one or more steps to be executed in one or more applications corresponding to the application profile;

executing, by at least one of the one or more computing devices, a first step of the one or more steps of the sequence in an application of the one or more applications corresponding to the application profile; and determining, by at least one of the one or more computing devices and based at least in part on the application environment, whether a post-execution condition is satisfied.

2. The method of claim 1, wherein determining, by at least one of one or more computing devices, an application context of the application environment of the user device comprises:

analyzing, by at least one of the one or more computing devices, a user interface of the user device with one or more screen analysis techniques;

identifying, by at least one of the one or more computing devices, a foreground application on the user device;

storing, by at least one of the one or more computing devices, one or more identified application elements and one or more operating system elements in a local cache and applying a multi-stage filtering process to each of the one or more identified application elements and one or more operating system elements; and ranking, by at least one of the one or more computing devices, one or more filtered application elements and one or more operating system elements by relevance based at least in part on one or more of the one or more parameters of the command.

3. The method of claim 1, further comprising generating, by at least one of the one or more computing devices, an application profile based at least in part on the application context of the application environment of the user device and the one or more parameters of the command, wherein generating, by at least one of the one or more computing devices, an application profile based at least in part on the application context of the application environment of the user device and the one or more parameters of the command comprises:

identifying, by at least one of the one or more computing devices, one or more data sources that include data corresponding to one or more actions that can be performed in an application;

analyzing, by at least one of the one or more computing devices, the one or more data sources to extract data corresponding to one or more actions that can be performed in the application;

parsing, by at least one of the one or more computing devices, the extracted data corresponding to one or more actions that can be performed in the application to identify one or more structured pairs of labels and actions that can be performed in the application;

converting, by at least one of the one or more computing devices, one or more of the one or more structured pairs of labels and actions that can be performed in the application to a text-to-text transformer model;

processing, by at least one of the one or more computing devices, one or more of the one or more text-to-text transformer model-formatted structured pairings of labels and actions to generate one or more processed text-to-text transformer model-formatted structured pairings of labels and actions;

generating, by at least one of the one or more computing devices, a validation report corresponding to one or more of the one or more processed text-to-text transformer model-formatted structured pairings of labels and actions; and storing, by at least one of the one or more computing devices, an application profile comprising one or more of the one or more processed text-to-text transformer model-formatted structured pairings of labels and actions.

4. The method of claim 1, wherein executing, by at least one of the one or more computing devices, a first step of the one or more steps of the sequence in an application of the one or more applications corresponding to the application profile comprises:

retrieving, by at least one of the one or more computing devices, the sequence;

fetching, by at least one of the one or more computing devices, a step definition corresponding to the first step of the sequence;

determining, by at least one of the one or more computing devices, whether a pre-condition to execute the first step of the sequence is satisfied;

wherein if the pre-condition to execute the first step of the sequence is determined satisfied, executing, by at least one of the one or more computing devices, a first step of the one or more steps of the sequence in an application of the one or more applications corresponding to the application profile further comprises:

executing, by at least one of the one or more computing devices, the first step of the sequence in an application of the one or more applications corresponding to the application profile, and wherein if the pre-condition to execute the first step of the sequence is determined not satisfied, executing, by at least one of the one or more computing devices, a first step of the one or more steps of the sequence in an application of the one or more applications corresponding to the application profile further comprises:

generating, by at least one of the one or more computing devices and based at least in part on determining the pre-condition to execute the first step of the sequence is not satisfied, a prompt requesting user intervention;

receiving, by at least one of the one or more computing devices, a response to the prompt requesting user intervention, the response comprising a second user input;

executing, by at least one of the one or more computing devices and based at least in part on the response to the prompt requesting user intervention, the first step of the sequence in an application of the one or more applications corresponding to the application profile; and updating, by at least one of the one or more computing devices and based at least in part on the response to the prompt requesting user intervention, the sequence.

5. The method of claim 1, wherein the sequence comprises a plurality of steps, wherein if the post-execution condition of the first step is determined satisfied, the method further comprises:

executing, by at least one of the one or more computing devices, a next step of the plurality of steps of the sequence in an application of the one or more applications corresponding to the application profile, and wherein if the post-execution condition of the first step is determined not satisfied, the method further comprises:

generating, by at least one of the one or more computing devices and based at least in part on determining the post-execution condition of the first step of the sequence is not satisfied, a prompt requesting user intervention;

receiving, by at least one of the one or more computing devices, a response to the prompt requesting user intervention, the response comprising a second user input;

executing, by at least one of the one or more computing devices and based at least in part on the response to the prompt requesting user intervention, the next step of the plurality of steps of the sequence in an application of the one or more applications corresponding to the application profile; and updating, by at least one of the one or more computing devices and based at least in part on the response to the prompt requesting user intervention, the sequence.

6. The method of claim 1, wherein parameters of the command comprise one or more of:

an explicit intent, a goal-oriented intent, and a constraint.

7. The method of claim 1, further comprising:

generating, by at least one of the one or more computing devices, a report comprising one or more indicators corresponding to whether one or more steps of the sequence were executed successfully;

classifying, by at least one of the one or more computing devices, the one or more indicators corresponding to whether one or more steps of the sequence were executed successfully;

training, by at least one of the one or more computing devices, one or more models based at least in part on the one or more indicators corresponding to whether one or more steps of the sequence were executed successfully; and performing, by at least one of the one or more computing devices, a validation assessment of the training using regression testing.

8. One or more non-transitory computer-readable media comprising instructions that, when executed by a computing system, cause the computing system to:

receive a first user input;

analyze, based at least in part on a user profile, the first user input to detect a command to be performed on a user device;

determine an application environment of the user device based at least in part on traversing one or more accessibility trees corresponding to an operating system of the user device and one or more applications of the user device;

analyze, based at least in part on the application environment of the user device, the command using a natural language understanding (NLU) model to identify one or more parameters of the command;

retrieve an application profile based at least in part on the application environment of the user device and the one or more parameters of the command;

generate, based at least in part on the application profile and one or more of the one or more parameters of the command, a first sequence corresponding to the command, the sequence comprising one or more steps to be executed in one or more applications corresponding to the application profile;

execute a first step of the one or more steps of the sequence in an application of the one or more applications corresponding to the application profile; and determine, based at least in part on the application environment, whether a post-execution condition is satisfied.

9. The one or more non-transitory media of claim 8, wherein the instructions that, when executed by the computing system, cause the computing system to determine an application context of the application environment of the user device comprise instructions that cause the computing system to:

analyze a user interface of the user device with one or more screen analysis techniques;

identify a foreground application on the user device;

store one or more identified application elements and one or more operating system elements in a local cache and applying a multi-stage filtering process to each of the one or more identified application elements and one or more operating system elements; and rank one or more filtered application elements and one or more operating system elements by relevance based at least in part on one or more of the one or more parameters of the command.

10. The one or more non-transitory media of claim 8, wherein the instructions that, when executed by the computing system, cause the computing system to generate an application profile comprise instructions that cause the computing system to:

identify one or more data sources that include data corresponding to one or more actions that can be performed in an application;

analyze the one or more data sources to extract data corresponding to one or more actions that can be performed in the application;

parse the extracted data corresponding to one or more actions that can be performed in the application to identify one or more structured pairs of labels and actions that can be performed in the application;

convert one or more of the one or more structured pairs of labels and actions that can be performed in the application to a text-to-text transformer model;

process one or more of the one or more text-to-text transformer model-formatted structured pairings of labels and actions to generate one or more processed text-to-text transformer model-formatted structured pairings of labels and actions;

generate a validation report corresponding to one or more of the one or more processed text-to-text transformer model-formatted structured pairings of labels and actions; and store an application profile comprising one or more of the one or more processed text-to-text transformer model-formatted structured pairings of labels and actions.

11. The one or more non-transitory media of claim 8, wherein the instructions that, when executed by the computing system, cause the computing system to execute a first step of the one or more steps of the sequence comprise instructions that cause the computing system to:

retrieve the sequence;

fetch a step definition corresponding to the first step of the sequence;

determine whether a pre-condition to execute the first step of the sequence is satisfied;

wherein if the pre-condition to execute the first step of the sequence is determined satisfied, the instructions further cause the computing system to:

execute the first step of the sequence in an application of the one or more applications corresponding to the application profile, and wherein if the pre-condition to execute the first step of the sequence is determined not satisfied, the instructions further cause the computing system to:

generate, based at least in part on determining the pre-condition to execute the first step of the sequence is not satisfied, a prompt requesting user intervention;

receive a response to the prompt requesting user intervention, the response comprising a second user input;

execute, based at least in part on the response to the prompt requesting user intervention, the first step of the sequence in an application of the one or more applications corresponding to the application profile; and update, based at least in part on the response to the prompt requesting user intervention, the sequence.

12. The one or more non-transitory media of claim 8, wherein the sequence comprises a plurality of steps, wherein if the post-execution condition of the first step is determined satisfied, the instructions, when executed by the computing system, further cause the computing system to:

execute a next step of the plurality of steps of the sequence in an application of the one or more applications corresponding to the application profile, and wherein if the post-execution condition of the first step is determined not satisfied, the instructions, when executed by the computing system, further cause the computing system to:

generate, based at least in part on determining the post-execution condition of the first step of the sequence is not satisfied, a prompt requesting user intervention;

receive a response to the prompt requesting user intervention, the response comprising a second user input;

execute, based at least in part on the response to the prompt requesting user intervention, the next step of the plurality of steps of the sequence in an application of the one or more applications corresponding to the application profile; and update, based at least in part on the response to the prompt requesting user intervention, the sequence.

13. The one or more non-transitory media of claim 8, wherein the instructions, when executed by the computing system, further cause the computing system to:

generate a report comprising one or more indicators corresponding to whether one or more steps of the sequence were executed successfully;

classify the one or more indicators corresponding to whether one or more steps of the sequence were executed successfully;

train one or more models based at least in part on the one or more indicators corresponding to whether one or more steps of the sequence were executed successfully; and perform a validation assessment of the training using regression testing.

14. A system comprising:

one or more processors; and at least one memory operatively coupled to the processor and storing instructions that, when executed by at least one processor of the one or more processors, cause the system to:

receive a first user input;

analyze, based at least in part on a user profile, the first user input to detect a command to be performed on a user device;

determine an application environment of the user device based at least in part on traversing one or more accessibility trees corresponding to an operating system of the user device and one or more applications of the user device;

analyze, based at least in part on the application environment of the user device, the command using a natural language understanding (NLU) model to identify one or more parameters of the command;

retrieve an application profile based at least in part on the application environment of the user device and the one or more parameters of the command;

generate, based at least in part on the application profile and one or more of the one or more parameters of the command, a first sequence corresponding to the command, the sequence comprising one or more steps to be executed in one or more applications corresponding to the application profile;

execute a first step of the one or more steps of the sequence in an application of the one or more applications corresponding to the application profile; and determine, based at least in part on the application environment, whether a post-execution condition is satisfied.

15. The system of claim 14, wherein the instructions that, when executed by at least one processor of the one or more processors, cause the system to determine an application context of the application environment of the user device comprise instructions that, when executed by at least one processor of the one or more processors, cause the system to:

analyze a user interface of the user device with one or more screen analysis techniques;

identify a foreground application on the user device;

store one or more identified application elements and one or more operating system elements in a local cache and applying a multi-stage filtering process to each of the one or more identified application elements and one or more operating system elements; and rank one or more filtered application elements and one or more operating system elements by relevance based at least in part on one or more of the one or more parameters of the command.

16. The system of claim 14, wherein the instructions that, when executed by at least one processor of the one or more processors, cause the system to generate an application profile comprise instructions that, when executed by at least one processor of the one or more processors, cause the system to:

identify one or more data sources that include data corresponding to one or more actions that can be performed in an application;

analyze the one or more data sources to extract data corresponding to one or more actions that can be performed in the application;

parse the extracted data corresponding to one or more actions that can be performed in the application to identify one or more structured pairs of labels and actions that can be performed in the application;

convert one or more of the one or more structured pairs of labels and actions that can be performed in the application to a text-to-text transformer model;

process one or more of the one or more text-to-text transformer model-formatted structured pairings of labels and actions to generate one or more processed text-to-text transformer model-formatted structured pairings of labels and actions;

generate a validation report corresponding to one or more of the one or more processed text-to-text transformer model-formatted structured pairings of labels and actions; and store an application profile comprising one or more of the one or more processed text-to-text transformer model-formatted structured pairings of labels and actions.

17. The system of claim 14, wherein the instructions that, when executed by at least one processor of the one or more processors, cause the system to execute a first step of the one or more steps of the sequence comprise instructions that, when executed by at least one processor of the one or more processors, cause the system to:

retrieve the sequence;

fetch a step definition corresponding to the first step of the sequence;

determine whether a pre-condition to execute the first step of the sequence is satisfied;

wherein if the pre-condition to execute the first step of the sequence is determined satisfied, the instructions, when executed by at least one processor of the one or more processors, further cause the system to:

execute the first step of the sequence in an application of the one or more applications corresponding to the application profile, and wherein if the pre-condition to execute the first step of the sequence is determined not satisfied, the instructions, when executed by at least one processor of the one or more processors, further cause the system to:

generate, based at least in part on determining the pre-condition to execute the first step of the sequence is not satisfied, a prompt requesting user intervention;

receive a response to the prompt requesting user intervention, the response comprising a second user input;

execute, based at least in part on the response to the prompt requesting user intervention, the first step of the sequence in an application of the one or more applications corresponding to the application profile; and update, based at least in part on the response to the prompt requesting user intervention, the sequence.

18. The system of claim 14, wherein the sequence comprises a plurality of steps, wherein if the post-execution condition of the first step is determined satisfied, the instructions, when executed by at least one processor of the one or more processors, further cause the system to:

execute a next step of the plurality of steps of the sequence in an application of the one or more applications corresponding to the application profile, and wherein if the post-execution condition of the first step is determined not satisfied, the instructions, when executed by at least one processor of the one or more processors, further cause the system to:

generate, based at least in part on determining the post-execution condition of the first step of the sequence is not satisfied, a prompt requesting user intervention;

receive a response to the prompt requesting user intervention, the response comprising a second user input;

execute, based at least in part on the response to the prompt requesting user intervention, the next step of the plurality of steps of the sequence in an application of the one or more applications corresponding to the application profile; and update, based at least in part on the response to the prompt requesting user intervention, the sequence.

19. The system of claim 14, wherein the instructions, when executed by at least one processor of the one or more processors, further cause the system to:

generate a report comprising one or more indicators corresponding to whether one or more steps of the sequence were executed successfully;

classify the one or more indicators corresponding to whether one or more steps of the sequence were executed successfully;

train one or more models based at least in part on the one or more indicators corresponding to whether one or more steps of the sequence were executed successfully; and perform a validation assessment of the training using regression testing.

20. The system of claim 14, wherein parameters of the command comprise one or more of:

an explicit intent, a goal-oriented intent, and a constraint.

* * * * *